(12) United States Patent
Farrell

(10) Patent No.: US 7,752,199 B2
(45) Date of Patent: *Jul. 6, 2010

(54) ORGANIZING RELATED SEARCH RESULTS

(75) Inventor: Robert G. Farrell, Cornwall, NY (US)

(73) Assignee: International Business Machines Corporation, Armonk, NY (US)

( * ) Notice: Subject to any disclaimer, the term of this patent is extended or adjusted under 35 U.S.C. 154(b) by 314 days.

This patent is subject to a terminal disclaimer.

(21) Appl. No.: 11/847,221

(22) Filed: Aug. 29, 2007

(65) Prior Publication Data

US 2007/0294289 A1 Dec. 20, 2007

(51) Int. Cl.
*G06F 17/30* (2006.01)
(52) U.S. Cl. .................. 707/723; 707/789; 707/955
(58) Field of Classification Search .............. 707/3, 707/5, 100, 103 R–103 Z
See application file for complete search history.

(56) References Cited

U.S. PATENT DOCUMENTS

| | | | |
|---|---|---|---|
| 6,842,761 B2 * | 1/2005 | Diamond et al. | 707/104.1 |
| 7,050,992 B1 * | 5/2006 | Bowman et al. | 705/26 |
| 2005/0283473 A1 * | 12/2005 | Rousso et al. | 707/5 |
| 2006/0004892 A1 * | 1/2006 | Lunt et al. | 707/204 |

\* cited by examiner

*Primary Examiner*—Cheryl Lewis
(74) *Attorney, Agent, or Firm*—Cantor Colburn LLP; Vasken Alexanian

(57) ABSTRACT

The present invention provides system, methods, and apparatus for organizing objects obtained from data retrieval. It provides a method to assemble the objects into a set based upon their relevance ranking, associated metadata including categories, and the proximity of these categories in a graph. The method provides for selecting objects according to estimated difficulty, resource type, media format, or other criteria. It also provides for connecting objects into a best path in the graph. It also provides for selecting objects to fit a desired total duration and coverage of relevant categories in the graph. It also provides for organizing the objects into a particular sequence according to the particular metadata. The system, methods, and apparatus are suitable for use in information systems, learning management systems, and other systems employing data retrieval.

32 Claims, 29 Drawing Sheets

Fig. 10

Keywords: [____]  991

Duration (min): _ 1-2  _ 2-5  992
                _ 5-10  _ 10-20

Scope:  _ indepth  _ overview  993

Media:  _ text _ image _ video _ audio  994

Manual assembly?  [Yes] [No]  995

738  737  738           736    732 title2 (w/hyperlink to url3)     9 min    difficult
      Role1 – Category1 title1 (w/hyperlink to url2)     2 min    easy
      Role2 – Category1 title3 (w/hyperlink to url3)     5 min    difficulty
      Role2 – Category1

Total: 16 min    735

131 categories (A, B)
132 duration (in minutes)
133 media ("text/html", "video/mpeg", etc.)
134 resource types ("slide", "exercise", "diagram", etc.)
135 difficultylevel ("very easy", "easy", "medium", "difficult", "very difficult")
136 roles ("introduction", "motivation", etc.)

Fig. 14

| Object Identifier (151) |
|---|
| url |
| url2 |
| url3 |

| Category (221) | Url1 | url2 | url3 |
|---|---|---|---|
| A | | 1 | 0 |
| B | | 0 | 1 |
| C | | 0 | 0 |
| D | | 0 | 0 | object identifier (151)

| Categories (131) | Number of objects (232) | Sum of scores (233) | Average score (234) | Number of target objects (235) |
|---|---|---|---|---|
| A | | | | |
| B | | | | |
| C | | | | |
| D | | | | |

| Category Nodes (411) | A | B | C | D |
|---|---|---|---|---|
| A | 0 | 0 | 1 | 1 |
| B | 0 | 0 | 0 | 0 |
| C | 0 | 0 | 0 | 1 |
| D | 0 | 0 | 0 | 0 |

Category relationship edges (412)

Fig. 19

| Paths ID (441) | Path length (442) | Number of breaks (443) | Number of targets (444) | Total score (445) | Total duration (446) | Number of objects (447) |
|---|---|---|---|---|---|---|
|  |  |  |  |  |  |  |
|  |  |  |  |  |  |  |

310 url1 | url3 | url7 unique object identifier (151)

| Category Order (710) | Role Order (720) | Difficulty Order (740) | Resource Type Order (750) |
|---|---|---|---|
| A | Introduction | Very Easy | Slides |
| C | Motivation | Easy | Text |
| B | Concepts | Medium | |
| E | Procedures | Difficult | |
| D | Conclusions | Very Difficult | |

111 keywords — List of String: {"j2ee", "websphere"}

112 duration — Tuple of 2 Integers: [ min, max ]

113 search scope — String: one of "overview" or "indepth"

114 desired media types & resource types — List of String: {"text", "slide"}

116 desired difficulty levels — List of String: {"very easy" "easy"}

| Object Identifier (151) | Score (143) |
|---|---|
| url4 | 50 |
| url6 | 76 |
| url3 | 83 |

ORGANIZING RELATED SEARCH RESULTS

FIELD OF THE INVENTION

The present invention is directed toward the field of data retrieval. It is specifically directed toward graph algorithms to automate organizing related search results. Primary computer and Web applications are in information, learning management, training, instruction, and education systems.

BACKGROUND OF THE INVENTION

Data retrieval involves searching over a collection of objects to find a particular object or set of objects. The process of searching involves ranking objects in the collection with respect to a query to yield a list of relevant objects. Objects are digital data. Objects in a collection typically have a unique identifier. An ordering of relevant objects is computed to create a list of search results. The most relevant objects in the search results list are listed first. The ranking of objects on the search result list is based upon the relative match of the query to the digital data. Data retrieval may involve searching over a collection of objects in a database and returning a set of objects that match a query exactly based upon attributes and relationships between objects. Objects may be in a media format other than text, such as audio, video, or image. Time-varying media such as audio and video have a time duration. If the field is information retrieval, objects are typically documents stored in files containing information and the query takes the form of key words ("keywords") or phrases entered by users. The query keywords are typically matched against the words in the document file.

One common form of organization for objects in an ordered set. A set may be partially or totally ordered. Objects within a set may be sorted using a comparison function. A comparison function may sort objects along a particular scale. Data retrieval systems may filter objects from the search results into subsets of objects. Data retrieval systems may sort objects from the search results list alphabetically by title, numerically by date, or by using any other ordering.

The present invention applies to data retrieval. We require that objects are ranked, but the ranking could be based upon the object's digital data or metadata associated with the object and contained in a metadata description. A metadata description is typically stored in a metadata file. Metadata is data that is typically associated a particular object in the collection, which could be entered manually by a human editor or computed automatically. The metadata file may include one or more categories. Categories may group objects by topic, discipline, concept, or other affinity, often according to an agreed upon taxonomy or classification system. Human editors or automated computer programs may classify objects into categories. The metadata file may be stored in a database. Metadata includes metadata elements (also called properties or attributes) and their values. Metadata may describe the content, quality, condition, type, format, duration, level of detail, level of complexity, level of interactivity, role, human language, geographical coverage, cultural aspects, version, level of interactivity, density, and use of data. Metadata values may be ordinal, numeric, or other data types. Metadata values may be selected from a finite vocabulary. Metadata values may have a preferred or natural order.

Data retrieval systems may organize objects by category and use categories to improve the display and access to objects. Objects may be classified into one or more categories. A category contains zero or more objects. Objects may be rank ordered within categories. Data retrieval systems may include categories related to one another in a graph and organize objects by the graph or use the graph to improve the display and access to objects. A graph is comprised of nodes (also called vertices) and edges. A graph is either directed or undirected. A path in a graph is a sequence of edges connecting nodes in a directed graph. A path data structure may include the nodes connected by edges comprising the path. A graph may be connected or unconnected. A graph of categories and relationships may be called a semantic network, topic graph, or metathesaurus. Several algorithms exist to automatically classify documents into categories and to find objects by traversing a graph of categories and relationships.

Computer systems storing a collection of objects often require human editors who manually assemble objects from the collection into a set or sets of objects to group, filter, arrange, organize, or list the objects for human users. Human editors may also create new objects and create links from object to another. On the World-Wide Web (Web) network of computer systems, for example, objects are Web resources. Each Web resource is identified by its Uniform Resource Identifier (URI). Web resources that have hyperlinks that are contained in Web resources, also called Web pages, to link to other related Web resources. Human users of the Web are typically also editors who manually create hyperlinks between related Web resources. Finding relevant objects and deciding how to assemble and link these objects to created sets of related objects is a time-consuming and manual process.

Computer systems may organize documents, media, and other documents by accessing the object's metadata description. Time-varying media, for example, may have a metadata description that includes a duration and computer systems displaying time-varying media may sorted by objects by this duration. Computer systems may store the ordered set in a structured data file. For example, computer systems may store an ordered set of links to other files in a file in a structured data file format, such as XML, providing data elements in a hierarchical structure.

There are many computer applications requiring structured data files with links to other data files. Computer applications providing means for storing and accessing electronic books, for example, typically organize files containing parts of the book into a table of contents file having links to part of the book to provide for easy access to each part and forming a coherent set that has a preferred order for reading.

Learning management, instruction, training, and education systems provide, deliver, or offer courses to users. These systems interact with a user or users to provide instruction or enable learning using documents, media, and other digital objects on a computer or over the Internet to a user accessing a Web browser program on a computer. These systems may also be called Electronic learning (e-learning) systems. Electronic learning systems often provide a course outline that consists of an organized list or hierarchy of lessons. Electronic learning systems often allow the system or the user to initiate the process of navigating to a given lesson. Lessons are typically listed in a preferred learning order. Lessons are typically linked to the next lesson and previous lesson in the preferred learning order. Electronic learning systems typically store the ordered set of lessons in a structured data file format.

The IMS Global Learning Consortium, Inc. (IMS), has developed the IMS Content Packaging specification for aggregating assembled learning materials into an interoperable, distributable package. The package includes an ordered set of objects in an organization structure that can be stored by an electronic learning system and offered, provided, or delivered to a user or users in the form of a course. The IMS Content Packaging information model specification provides data elements for multiple hierarchical organization structures and multiple item data elements within each organization that have identifiers that are references to Web resources. A default primary organization structure is identified. Each Web resource can be a object with its metadata stored according to a particular schema.

Organizing objects for learning management, training, education, and instruction is usually performed by course developer accessing a document, media, or other application for creating and editing courses. The course developer takes into account the anticipated learning needs of the audience, their level of prior knowledge or skill, the amount of time available, and other factors. The course developer creates new courses by choosing appropriate media and designing appropriate lessons, activities, and other interactions for learners. The process of creating courses is time-consuming and can involve recreating lessons, activities, and other interactions and media resources that may already exist in some form elsewhere.

A collection of resources stored a database or file in the form of learning objects can allow the course developer using an editing application, database application, or other computer application to reuse resources from prior courses, thus reducing the cost of developing new courses. Associating metadata with each resource in the collection can help course developers identify and find learning objects of the appropriate duration, difficulty, resource type, media type, level of detail and other attributes to server a role as a component to assemble a new course. Course developers may identify topic, task, or other types of categories for objects and identify introduction, motivation, or other roles for each object within each category. Categories and roles provide for placement of objects within the organization structure of a course. For example, categories are formed into lessons organized as an ordered set within a course. Learning objects serving a particular role in a category can be formed into modules, units, or other parts within a lesson. Other organization structures are possible.

The Institute for Electronic Engineers, Inc. (IEEE) has formed the Learning Technology Standards Committee (LTSC) to develop accredited technical standards for learning technology. The American National Standards Institute (ANSI) approved a standard data model for Learning Object Metadata (LOM, 1484.12.1) submitted by LTSC. The LOM standard provides data elements for Learning Resource Type (resource type), Difficulty, Typical Learning Time (duration), technical format (media type), as well as title, description, keywords, and other metadata. An XML format for learning object metadata files enables e-learning systems to exchange learning object metadata between computer systems and applications conforming to the standard. Any object with a learning object metadata file is termed a "learning object". Learning objects and their associated learning object metadata can be stored in a repository. A repository is a database or collection of files containing metadata. A repository references local or remote (Web) objects (resources) and metadata. A learning object content repository references both learning objects and learning object metadata. A learning object may be executed as program code in a Web browser providing a duration of execution and for interaction with the user. A learning object may communicate with a learning management system using an agreed upon data communication protocol. Data communicated to a learning management system may be used by the learning management system to select the next learning object a particular order within a course.

Electronic learning systems may provide their users with access to a search feature for finding lessons, media, activities, or other learning objects. Electronic learning systems may allows users to specify a query to find learning objects of an appropriate duration, difficulty, media type, or other metadata stored in the metadata files associated with each learning object. However, learning objects are not typically automatically assembled, organized, and formed into a course in response to a user query.

SUMMARY OF THE INVENTION

Thus to overcome these problems, in a first aspect the present invention maps objects from search results to one or more categories in a graph, computes statistics for each category based upon the mapped objects, and then uses both the statistics for each category and the relationships between categories encoded as the edges of the graph to find a best path through the graph. The best path is computed using Dijkastra's graph search algorithm. The cost of traversing an edge in the graph is based upon the relevance of objects mapped to that category. Paths are evaluated using a measure of coherence. Coherent paths have the fewest number of breaks. A break in the path happens when a category does not have enough relevant objects.

In a second aspect, the invention also provides a method to connect target objects. Target objects can be selected by a user, or can be selected from the most relevant objects from the search results. Target objects are mapped to specific categories that need to be connected to form a coherent path. The statistics for each category are updated to include the number and total relevant score of relevant objects. The graph traversal stops when all target objects have been connected. If the target objects are all within a depth limit, the best path is a minimum spanning tree. However, if some targets are beyond the depth limit, then the algorithm starts traversing the graph again from another target until all target objects have been visited.

In a further aspect, the invention also provides a method to sort a set of objects, obtaining an ordered set that is used to provide an improved progression through the related objects. The order of the objects is derived from the an ordering of the metadata vocabulary. The invention provides means of sorting objects according to a partial ordering of category metadata values, a partial ordering of role metadata values, and other partial orderings of object metadata vocabulary values. In an information system providing access to electronic books, the invention provides a means to create a table of contents with links to each section of the book In a electronic learning system, the invention provides means to create an organization structure to form a course.

In an example embodiment, the present invention provides a method for data retrieval. The method comprising creating a set of related objects from a collection of objects. The creation includes the steps of: searching for a list of relevant objects and obtaining a rank-ordered list; selecting any target objects from the rank-ordered list, mapping the relevant objects in the rank-ordered list into categories and computing category statistics; connecting the categories into paths in a graph, [the graph having a node for each category and edges based upon category relationships]; choosing a best path in the graph based upon a path evaluation criterion; and selecting objects in categories on the best path based upon an object selection criterion.

Also in the example embodiment, the present invention provides a system for assembling learning objects from a repository into an organization structure to form a course. The system provides a means for sorting the particular learning objects according to learning object metadata, creating an organizational structure for the particular learning objects, and displaying the organizational structure in the form of course.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 10 shows a screen of a system for entering a query;

FIG. 12 shows a screen of a system for linking to objects in an ordered aggregation;

FIG. 13 shows a data structure for storing a metadata;

Figure 14:
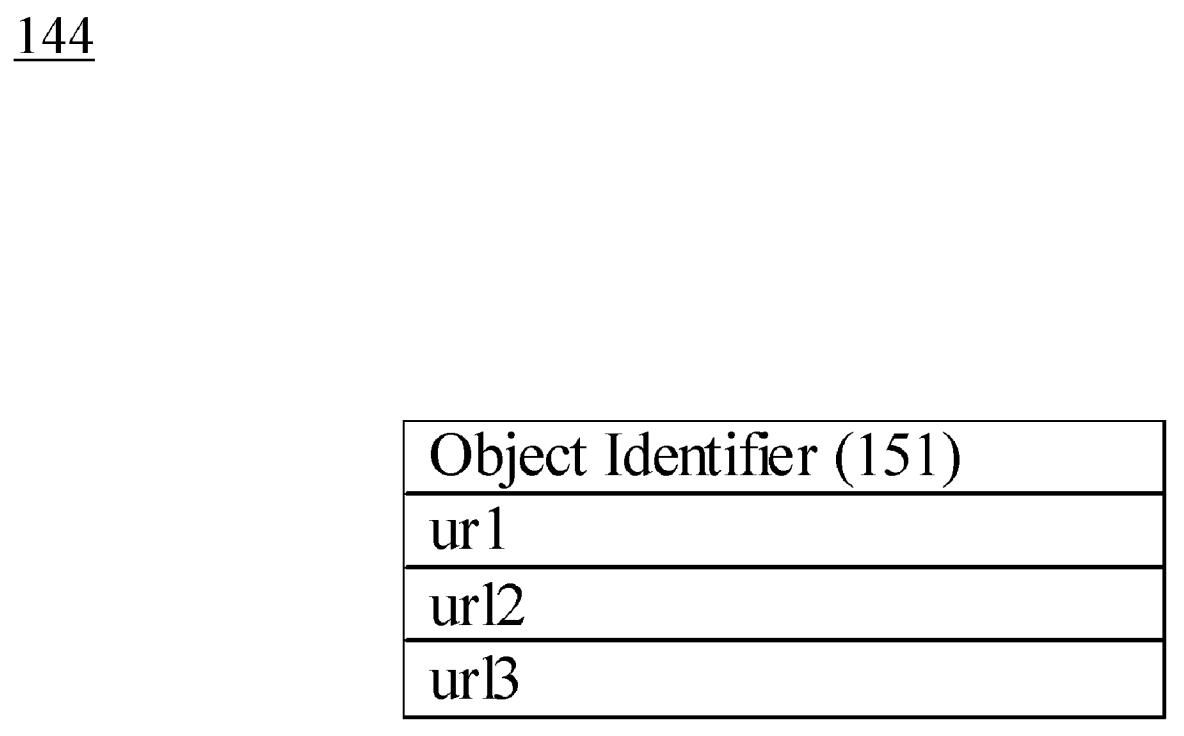

FIG. 14 shows a data structure for storing a rank-ordered list of relevant objects;

FIG. 15 shows a data structure for storing a category-object mapping;

FIG. 16 shows a data structure for storing category data;

FIG. 17 shows a data structure for storing a graph of category nodes with relationship edges;

FIG. 19 shows a data structure for storing path data;

FIG. 22 shows a data structure for storing target objects;

FIG. 24 shows a data structure for storing a preferred order for metadata vocabulary;

FIG. 25 shows a data structure for query parameters and values;

FIG. 26 shows a data structure for storing a list of object scores;

DETAILED DESCRIPTION OF THE INVENTION

Figure 1:
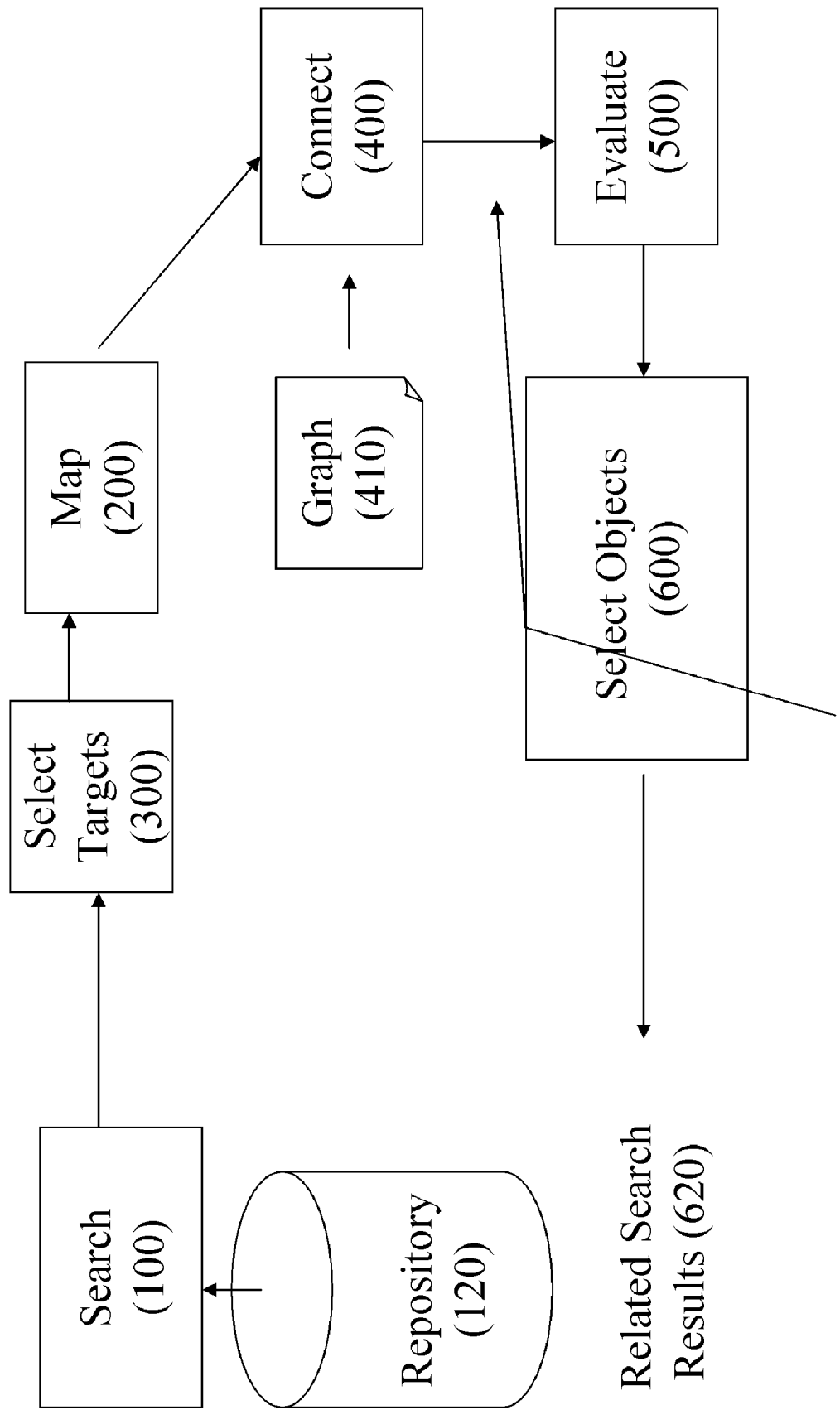
FIG. 1 shows a flowchart of a method of creating a set of related objects.

This invention provides methods, apparatus and systems for automatically organizing search results. It provides methods to create a set of objects from a collection of objects using a data retrieval algorithm. It describes how to search for relevant objects from the collection to match a query, map search results to categories, traverse a graph connecting these categories to find a best path according to various heuristic criteria, and then select objects on the path to fit various parameters.

For a collection of objects that have a duration, the invention provides a parameter can be adjusted to limit the total duration of set of objects on the path. If an overview treatment is needed, a parameter can be set to select the most relevant objects from each of several categories on the path. If an indepth treatment is needed, a method is provided to select objects in categories in close proximity to a focus category before proceeding to select objects from related categories on the path.

This invention provides ways for selecting objects as targets for the graph traversal. The traversal algorithm assembles a set of objects on the path by attempting to reach any specified target objects and by penalizing breaks in the path with nodes having categories with only a few relevant objects. If no target objects are selected, the target objects are set to the most relevant search results.

This invention provides a process for mapping objects from the search results to one or more categories in a graph. The step of mapping includes computing statistics for each category based upon the objects contained within categories.

The invention provides ways to connect nodes into paths. In an example embodiment, the starting node is the category containing the most target objects and if there are two categories with an equivalent number of target objects, then the category with the highest total relevance score is chosen. The target nodes are the categories with a non-zero number of target objects. The best (lowest cost) path is computed using Dijkastra's graph search algorithm. The algorithm maintains a queue and a visited list. At any node in the graph, there is a list of child nodes. The cost of traversing a link in the graph is given by a cost function. The child nodes are sorted by cost. If multiple nodes have an equivalent cost, all of the nodes are traversed. The algorithm traverses child nodes with the greatest number of target objects. If an equivalent number of target objects are mapped to multiple child nodes, the node with the greatest total relevance score is traversed first. If a target is reached, it is removed from the list of remaining targets and the graph search terminates. Any child category nodes with no relevant objects are traversed, but a break count is incremented. The graph traversal stops when all target objects have been reached or a depth limit has been met. If all the target objects are reached, the best path is a minimum spanning tree. However, if some targets are beyond the depth limit, then the algorithm traverses the graph starting at the next best start node as determined by a list of remaining targets. The process continues until the remaining targets have been visited.

An evaluation process provides ways of choosing a best path from the paths list. Paths are evaluated using a measure of coherence. Coherent paths connect the most number of target objects. For paths with an equivalent number of target objects, coherent paths have the fewest number of breaks. For paths with an equivalent number of breaks, the path with the highest sum of target relevance scores is chosen as the most coherent. Given the best path, the invention provides ways to select objects mapped to categories on a path based upon parameters provided in the query and on the statistics collected for each category by the mapping process. The invention provides an overview method to selects the most relevant objects from each category. The invention also provides an indepth method to chooses the most relevant objects from a given category before including objects from other categories. The choice of method is controlled by a search scope parameter that is part of the query.

The invention also provides a method to sort objects according a preferred order for metadata vocabulary, In an example embodiment, the method sorts the selected objects by the earliest position of the object's categories in an ordering of categories, then sorts within categories by the earliest position of the object's role in a role ordering. The method provides ways of sorting objects according to any ordinal value with a given order, such as a scale. In alternate embodiments, a difficulty scale or resource type order could be used. This invention also describes a system for assembling learning objects from a repository into an organization structure in response to a query and forming a course to display. The system provides a user interface screen for entering query keywords and query parameters to search for learning objects. The query interface screen provides ways of limiting the search for learning objects to particular types of learning resources, those fulfilling only particular instructional roles within the created course, and those within a specified range of difficulty. A process is described for creating an organizational structure for the learning objects [including placing learning objects into this structure]. The query user interface screen provides ways of adjusting the duration of the created course based upon the estimated learning time of learning objects placed in the organization structure as determined by duration metadata stored in the learning object metadata file for each learning object.

The organization structure is suitable for loading into a learning management system. The organization structure is used to create a dynamic Web page as a course outline and set of additional Web pages that link learning objects in a particular order to form a course pages in a format accessible over the Web from a Web browser. In an alternate embodiment, objects are executable programs that run in a Web browser and communicate with a management system. For example, objects could be learning objects that execute a program designed to track learner progress during an activity. Learning objects communicate the user's performance data during the activity to the learning management system. The learning management system uses the performance data to determine the next learning object to execute.

This invention provides advantages for information and data retrieval systems that display search results that are related to one another:

1) Information and data retrieval algorithms usually rank objects based on relevance to the query. Relevance ranking may result in a set of independent, unrelated, or even incoherent search results. Users of information and data retrieval systems may want to view particular related objects order orders a coherent group in the list of search results. This invention solves this problem by using both metadata associated with objects and relationships between the metadata to assemble related objects to improve coherence.

2) Information and data retrieval algorithms group search results by category or list the search results by rank. It is often difficult for users to get an overview of the relevant objects because the most relevant objects appear in many different categories and are thus not proximal to one another. This invention solves this problem by creating groups of objects based upon their relevance ranking, associated metadata including categories, and the proximity of these categories in a graph of category relationships.

3) Information and data retrieval systems usually retrieve search results based upon a query. The search results may include objects from many categories. However, it is often difficult for users to specify whether few relevant objects from each of many related categories (overview) or many relevant objects from each of few related categories (indepth) are preferred. The present invention solves this problem by providing a search scope as part of the query that determines which of two methods for selecting objects is used.

4) Information and data retrieval systems can require users to specify categories as part of the query to focus the search for related objects. However, it is often difficult for users to select particular categories without first viewing particular objects and their respective categories. The present invention solves this problem by providing a method of using user selections of target particular objects to identify a set of categories as start nodes, then searching the graph of category nodes and category relationship edges in vicinity proximity of the start nodes using a greedy graph search algorithm to find a minimum spanning tree connecting these nodes in a best path.

This invention also provides several advantages for electronic learning systems that provide learning objects to a user:

1) The duration of an course is usually determined at the time the course, or any other desired organization structure ordered, is constructed. However, users may want to size the course to their available time. This invention provides an algorithm that can attempt to size a course comprised of learning objects to a desired minimum time, maximum time, or time duration based upon the duration of selected learning objects.

2) The organization of learning objects within an course, or any other desired structure ordered, is usually performed manually. This manual organization process is time-consuming and non-uniform. This invention provides an algorithm that can sort selected learning objects quickly and uniformly into a progression and place them in a desired structure without human intervention.

This method is efficient with respect to current practice. One reason for this efficiency is because in current practice, metadata is derived automatically for each object or entered manually in parallel, by independent human editors, while object creation and assembly cannot be done independently and in parallel across objects because these processes involve the step of manually linking objects. In the present invention, a new method is possible whereby the links needed for assembly, sorting, and linking are isolated in the graph of categories and category relationships instead of the objects. In the new practice, the schema for the metadata in the repository is designed, the possible vocabulary for use in metadata files is developed, and then the relationships between the metadata vocabulary are designed for the entire repository, even before objects are identified. The practice is efficient because values from the vocabulary for the metadata are often repeated across metadata files because common metadata entry and editing tools are used by human editors, thus the effort to update the relationships between the metadata vocabulary is less than the effort involved in linking objects.

A example embodiment is shown in FIG. 1. A search step (100) creates a rank-ordered list of relevant objects from a collection (120). A target selection step (300) chooses a subset of target objects from the rank-ordered list. A mapping step (200) computes statistics for categories of objects in the rank-ordered list, including any target objects. A connecting step (400) traverses a graph (410) to generate a set of paths connecting the categories, including an evaluation step to choose a best path (500). An object selection step (600) selects particular objects on the best path to obtain the desired set of related search results (620).

Figure 6:
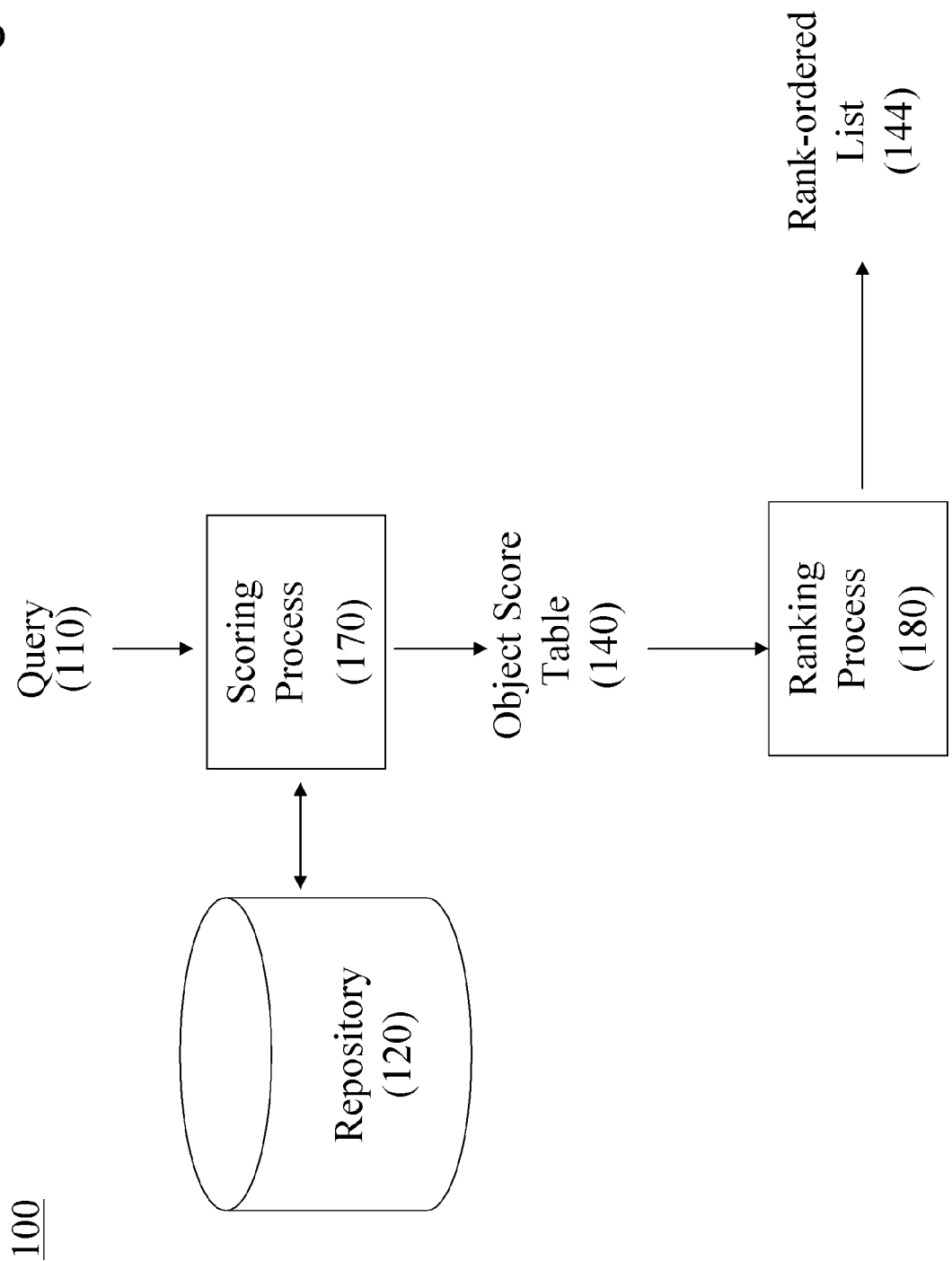
FIG. 6 shows a flowchart of a step of searching for objects and obtaining a rank-ordered list of related objects.

An example embodiment of the search process (100) is shown in FIG. 6. A prior art scoring process (170) computes a relevance score in the Object scrollable (140) for each object in the repository based upon a match to the query (140). The example embodiment combines any text from the Object file (150) and an XML form of the Metadata file into a combined XML file, produces a fast lookup index from the metadata values and text terms in the combined XML file, and then looks up the values of query parameters in the index. In the example embodiment, the query parameters include keywords (111), desired resource types and media type (114), and desired difficulty levels (116). Alternate embodiments match only the metadata values, only the text, and features of the object extracted and stored as metadata values. In the example embodiment, the query keyword parameters are matched using a weighted match based upon the frequency of text terms in the combined XML file and other query parameter values must match exactly with metadata values in the combined XML file. In other embodiments, a weighted score balancing the different query parameters may be used. A ranking process (180) lists the object identifiers (141) for the relevant objects in order by score in the rank-ordered list (144)

Figure 2:
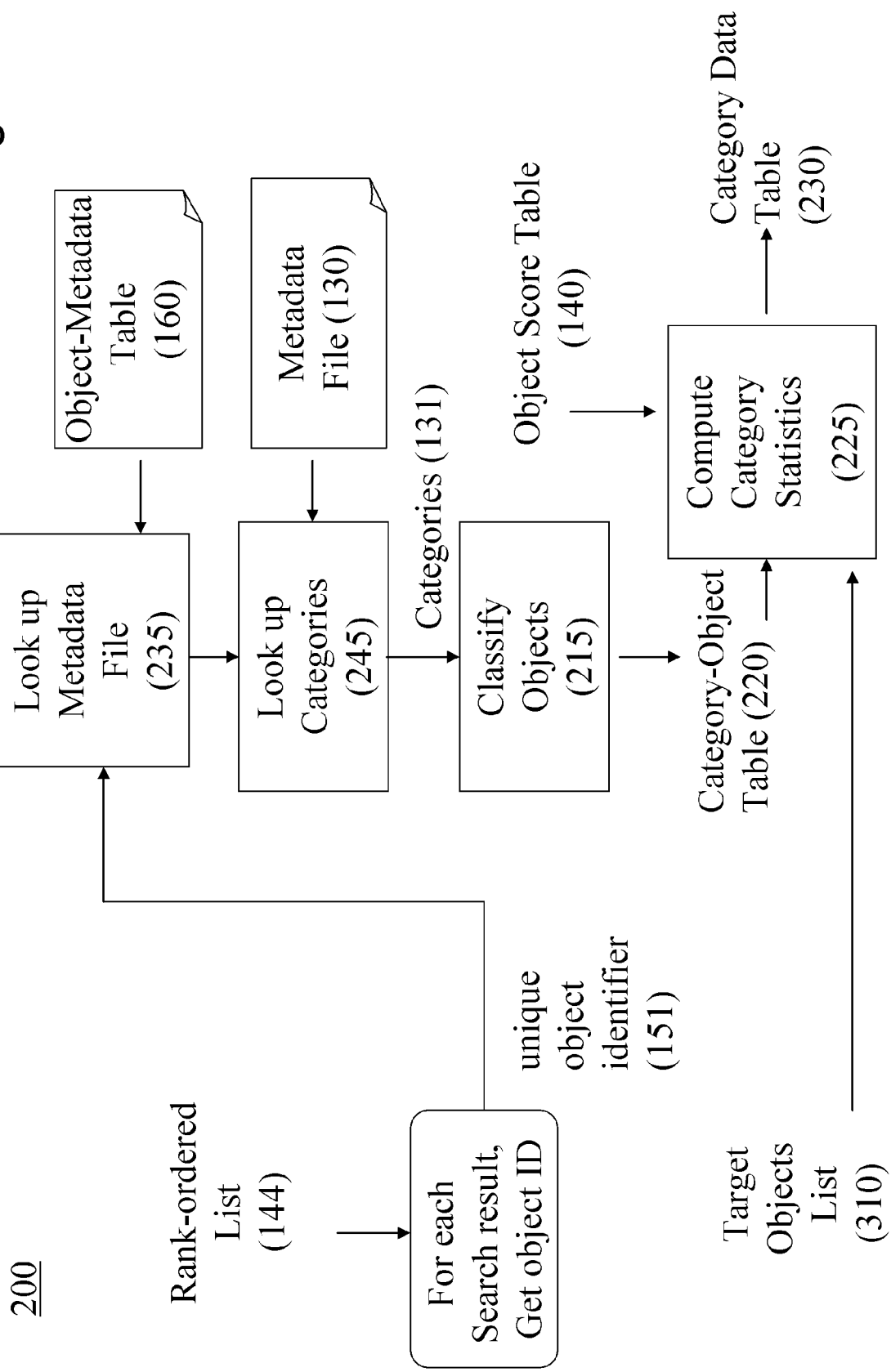
FIG. 2 shows a flowchart of a step of mapping a rank-ordered list into categories.

An example embodiment is shown in FIG. 2. The mapping process (200) takes as input the Target Objects List (310) from the target selection process and the rank-ordered list (144) from the search process. For each object identifier (151) listed in the rank-ordered list, the mapping process looks up the metadata file (130) for each object identifier (151) in the target objects list, looks up the category metadata values (131) in the given metadata file, and then stores the unique object identifier (151) with respect to each category (221) in the Category-Object Table (220). In an alternate embodiment, the classification into categories is computed from the digital data of the object.

The Compute Category Statistics process (225) updates the Category Data Table (230). For each category, it computes the number of objects mapped to the category (232), the sum of the relevance scores of all objects mapped to the category (233), and the average relevance score (234). If there are target selections, the mapping process also computes the number of target objects per category (235).

Figure 3:
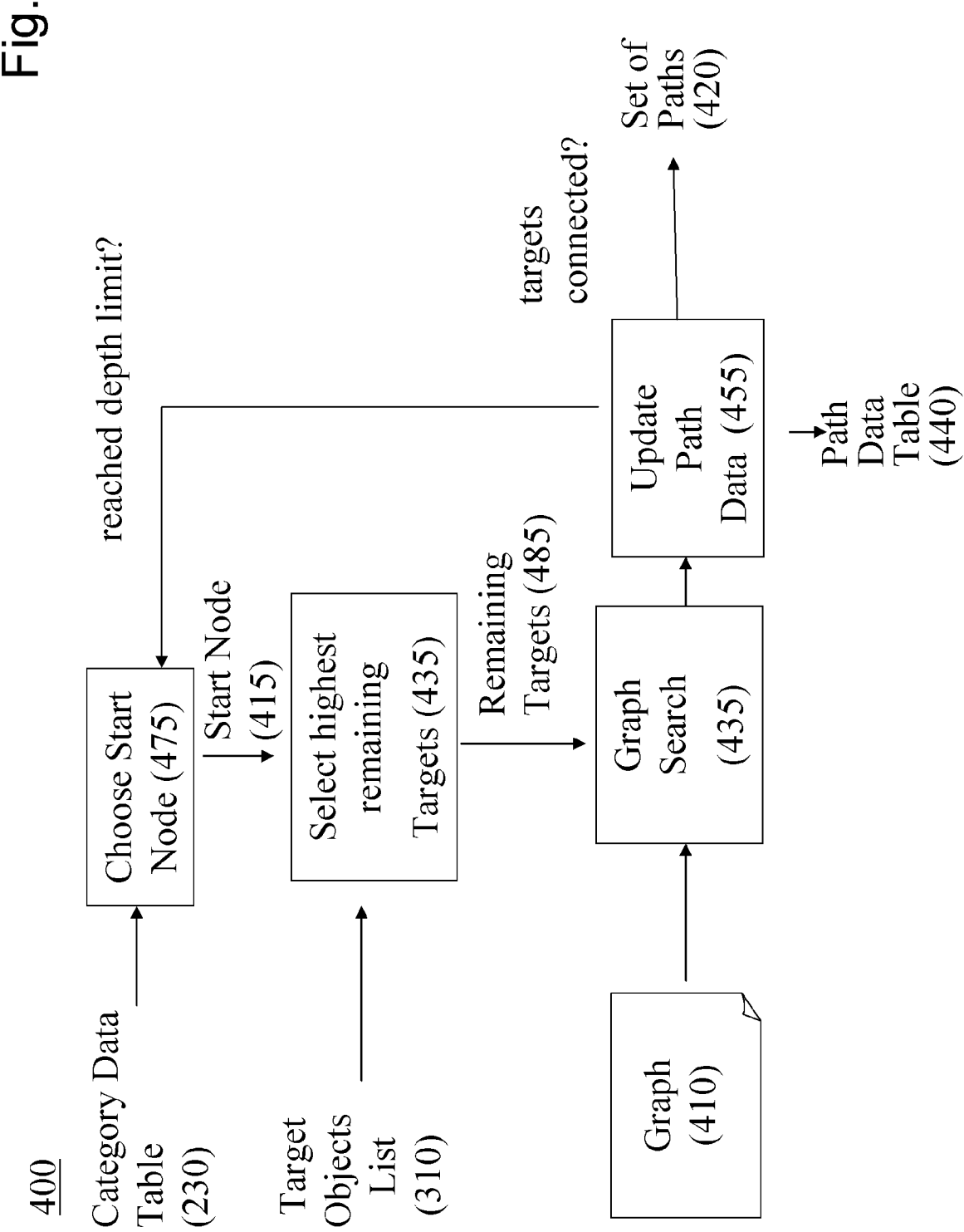
FIG. 3 shows a flowchart of a step of connecting categories into a best path in a graph.

An example embodiment is shown in FIG. 3. The connecting process (400) is a graph traversal algorithm that operates on a Graph (410) resulting in a Paths list (441) connecting nodes in the graph starting at a start node (415). The start node is the category with the highest number of target objects (235). If there are no target objects, the start node is a focus category having the highest sum of scores (233). Next, the connecting process selects the highest remaining targets (485) after removing the start node (475). At each iteration, the remaining targets (485) with less than a minimum, C, number of objects (232) are put to the bottom of the list so that they are not preferred as start nodes. This constant controls how much evidence, in the form of mapped objects, is required to determine the focus of the graph search. In the example embodiment, C is set to the constant 3. The graph search (486) searches to connect the remaining targets (485) starting at the start node. The graph search traverses the graph using a prior art greedy graph search algorithm that maintains a queue of nodes and a visited list. Nodes on the visited list are not traversed again Each Path (430) in the Paths list (441) includes category nodes (431) and category relationship edges (432). The Graph is represented in a table (410) where a one (1) means an directed edge between the category nodes on the row to the category node on the column, a zero (0) means no edge. In the example embodiment, the Graph is a connected, directed graph G=(V, E) where the vertices, V, are the set of category nodes (411) and the edges, E, are the set of relationships between categories. The example embodiment uses the Resource Description Framework (RDF) format to store the graph in a file and then loads the RDF file to create a set of connected graph node and edges. The nodes of the graph are categories from the a fixed category vocabulary. There is an edges in the graph between two category nodes if there is some kind of category relationship between the two nodes. A category relationship between two categories is a semantic notion of relatedness, such as one category being part of, a subclass of another category.

The traversal algorithm generates a Paths list (441) connecting categories through relationship edges. In the example embodiment, each time a node is added to the Paths list, the path length (442), the total of the category relevance scores (445), total duration (446), and number of objects (447) is updated in a Path Data Table (440). If a node added to the path is a category that has less than a constant M number of relevant objects mapped (232), the number of breaks (443) is increased. The minimum threshold M in the example embodiment is set to a small constant that provides the minimum number of objects per category required for minimal coherence, one (1). Other embodiments may compute a minimum number by assuming that the objects are randomly selected from a known distribution of objects per categories and identifying a break as a deviation from the expected distribution.

The graph search algorithm terminates at a fixed depth in the graph, a constant D. In the example embodiment, D is set to a small constant reflecting the desired number of categories, four (4). If target objects were selected, the graph search algorithm may terminate prior to the fixed depth D if all target objects were connected on the given path. If the fixed depth was reached and not all target objects were selected, each of the categories (131) of the target object with the highest rank (142) on the Search results table (140) are pushed on the queue and the traversal algorithm is restarted with the starting node set to the highest scoring of these categories in the Category Data Table (230), the depth reinitialized to zero (0). The algorithm terminates when there are no more targets (450).

Figure 4:
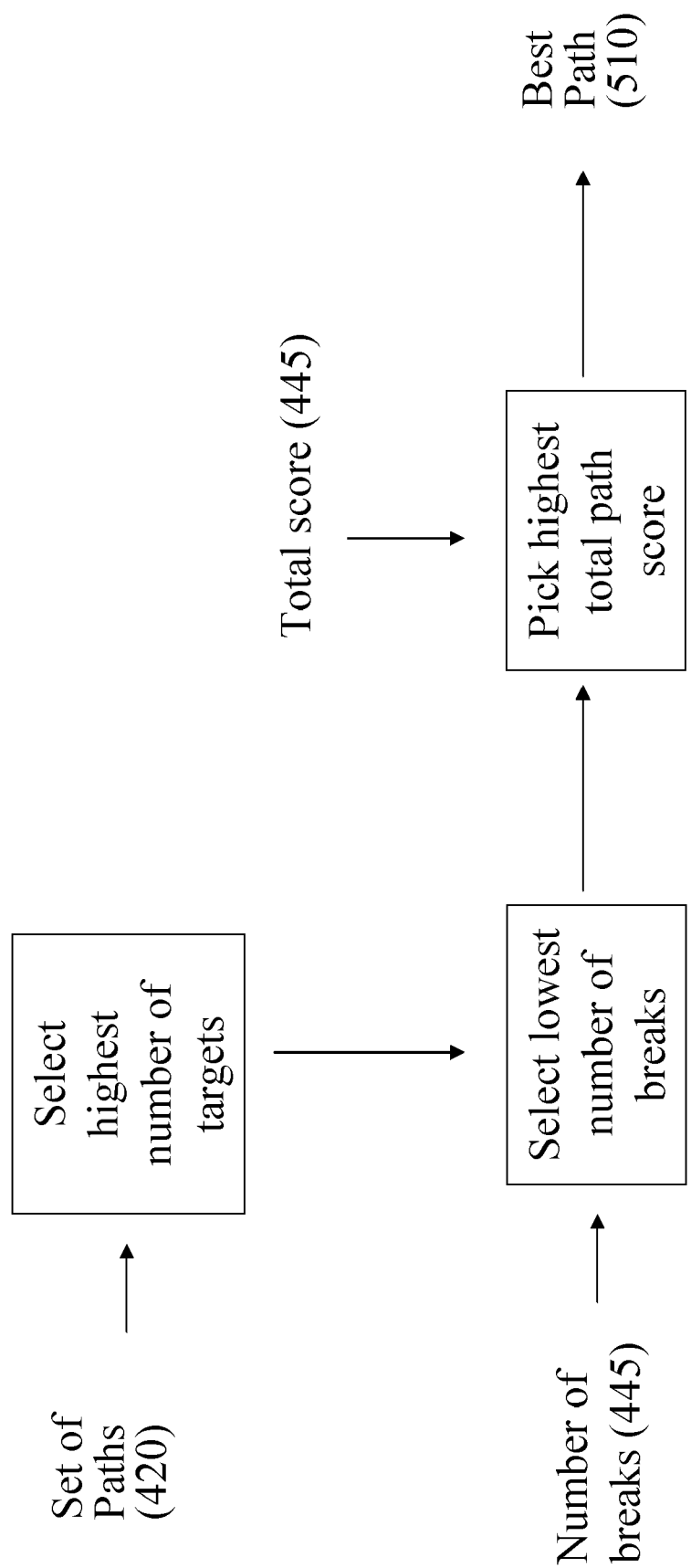
FIG. 4 shows a flowchart of a step of evaluating a choosing a best path in the graph.
Figure 5:
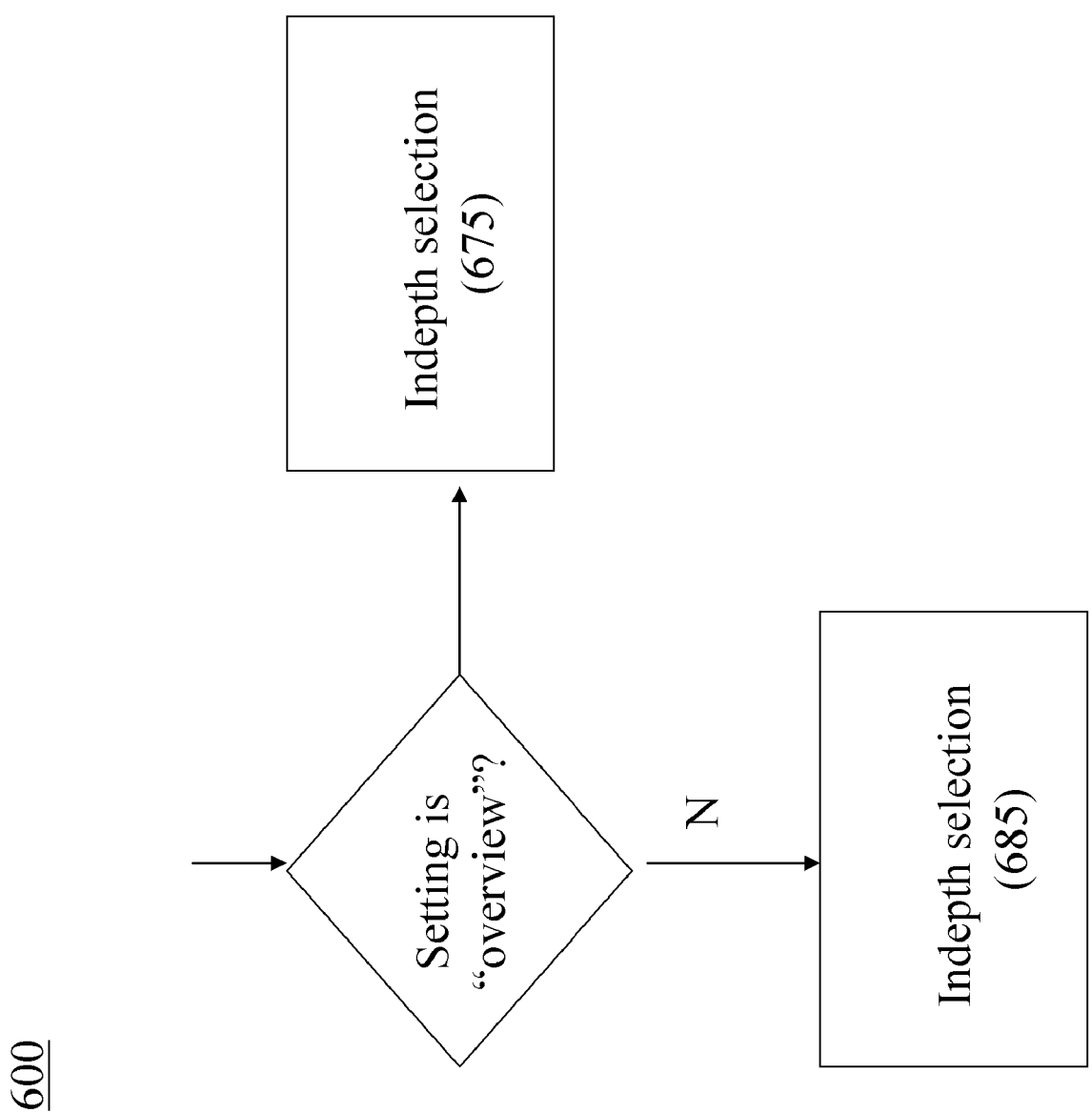
FIG. 5 shows a flowchart of a step of selecting particular objects in categories on the best path.

An example embodiment is shown in FIG. 4. The choosing process (500) applies an evaluation criteria to choose the best path (510) among the paths returned by the connecting process (441). Because of the depth limit, the graph traversal algorithm cannot be guaranteed to return the least cost (best) path. Therefore, a set of heuristic evaluation criteria are used to return a best path. First, if target objects were selected, that paths that have the most number of target objects are selected. If two best paths have an equivalent highest number of target objects or there are no target objects, the paths with the fewest number of breaks (443) are selected. If two best paths are still otherwise equivalent, the paths with the highest total score (445) are selected.

Objects are selected (600) using an object selection criteria. In the example embodiment, if there are target objects the Target objects (311) are added to the Selected Objects Set (610). If the user specified an overview search scope, the method iterates over the Best Path Nodes (512) selecting objects from the Category-Object Table (220) with the highest relevance rank (142) in the Search results table (140), without the sum of the total duration (446) of said selected objects exceeding the maximum duration (112). If the user specified an indepth search scope, the method selects the objects in the Category-Object Table (220) listed with category (221) equal to the start node (510) in rank (142) order without the sum of the total duration (446) of said selected objects exceeding the maximum duration (112). In another embodiment, a bin packing algorithm could be used to maximize the relevance of the objects fitting within the desired duration.

Figure 7:
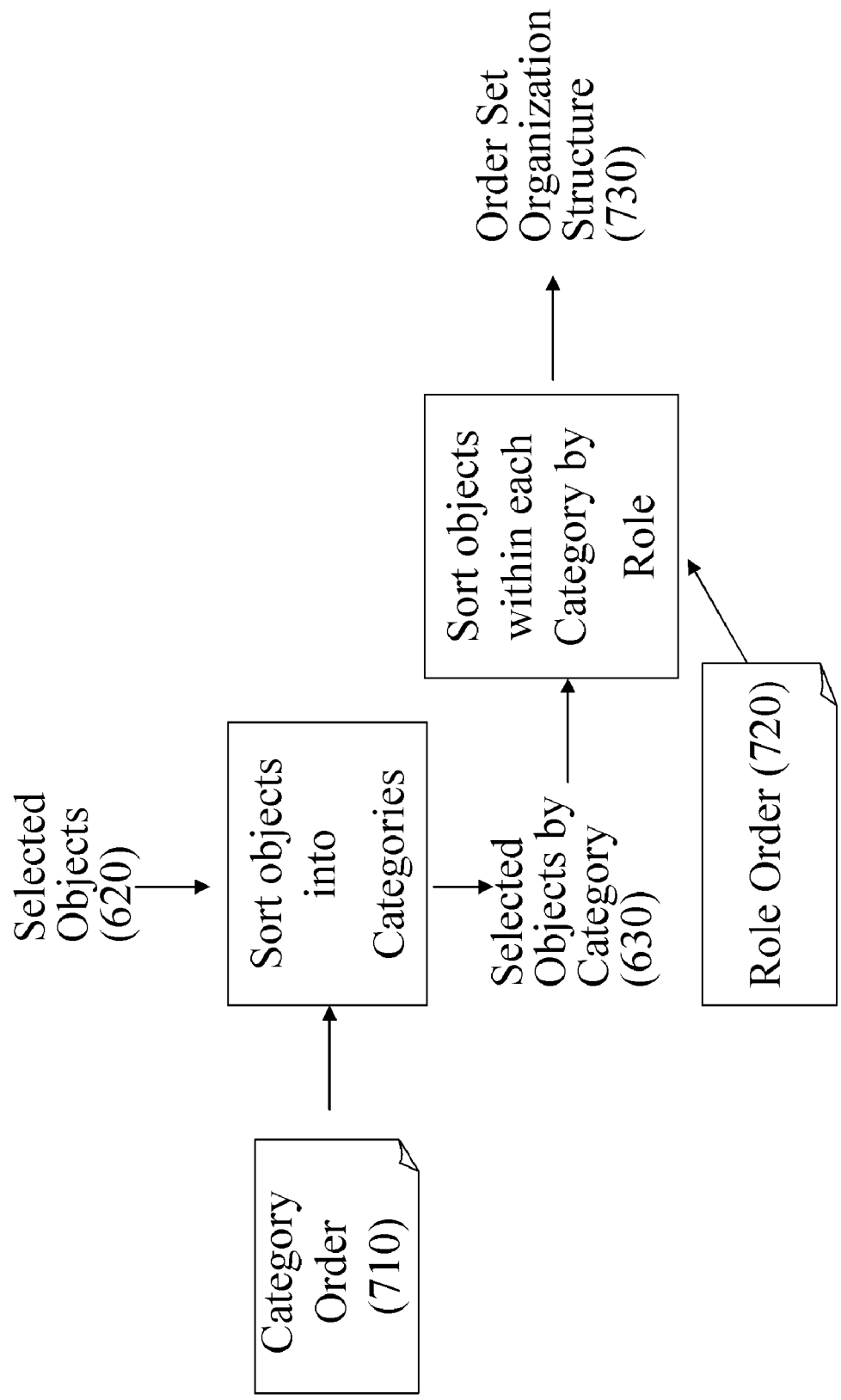
FIG. 7 shows a flowchart of a method of assembling an ordered set of related objects from a collection of objects.
Figure 8:
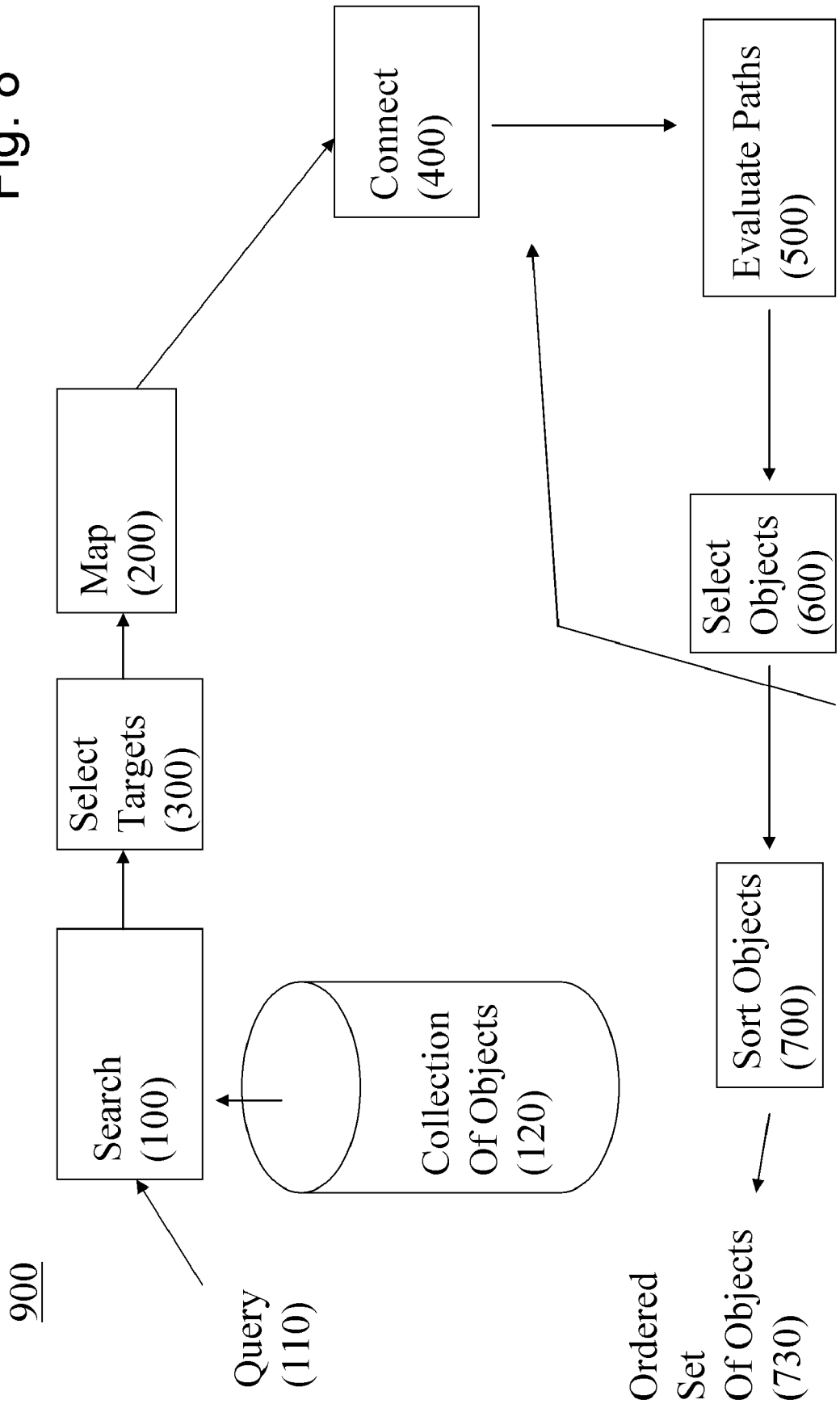
FIG. 8 shows a flowchart of a step of sorting objects by comparing a position of metadata values.
Figure 9:
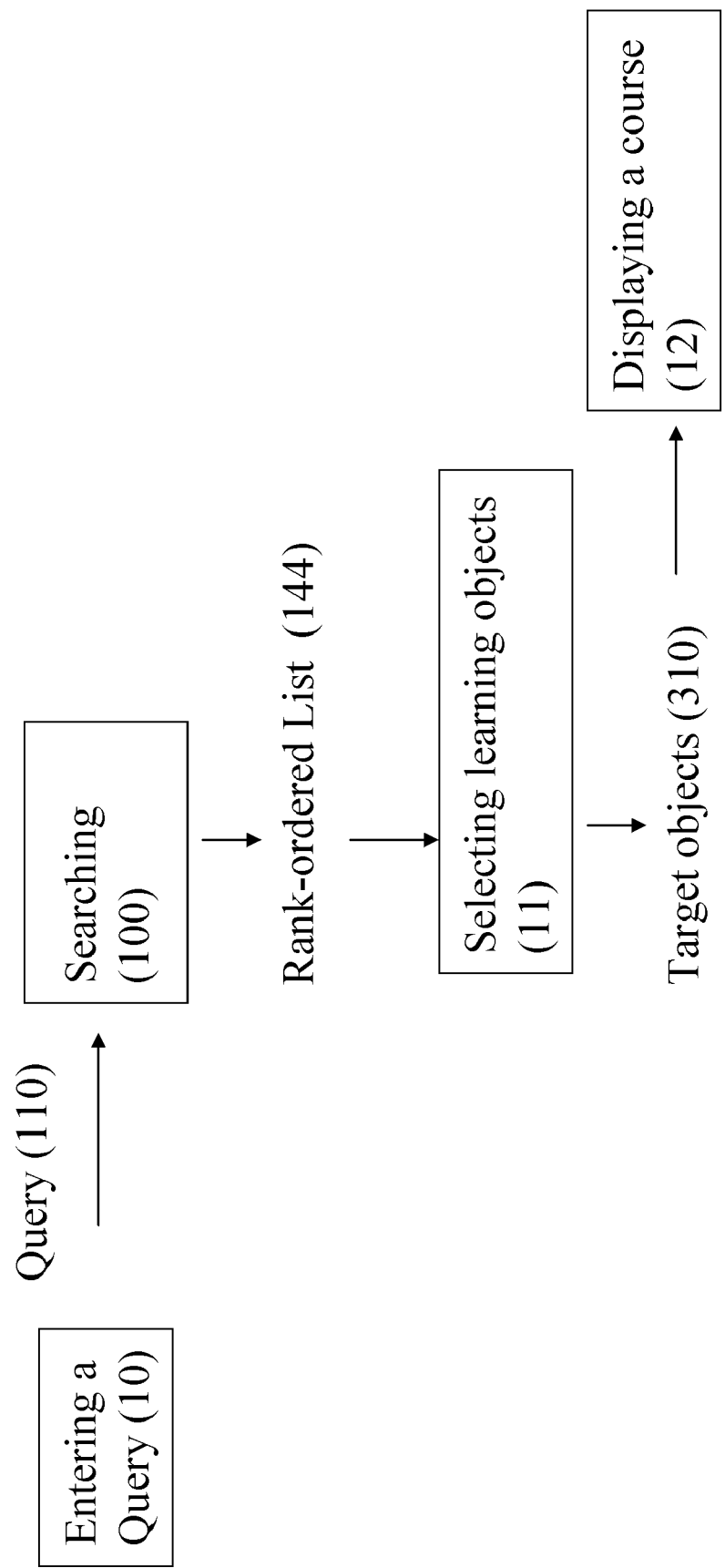
FIG. 9 shows a system for assembling learning objects to form a course.
Figure 29:
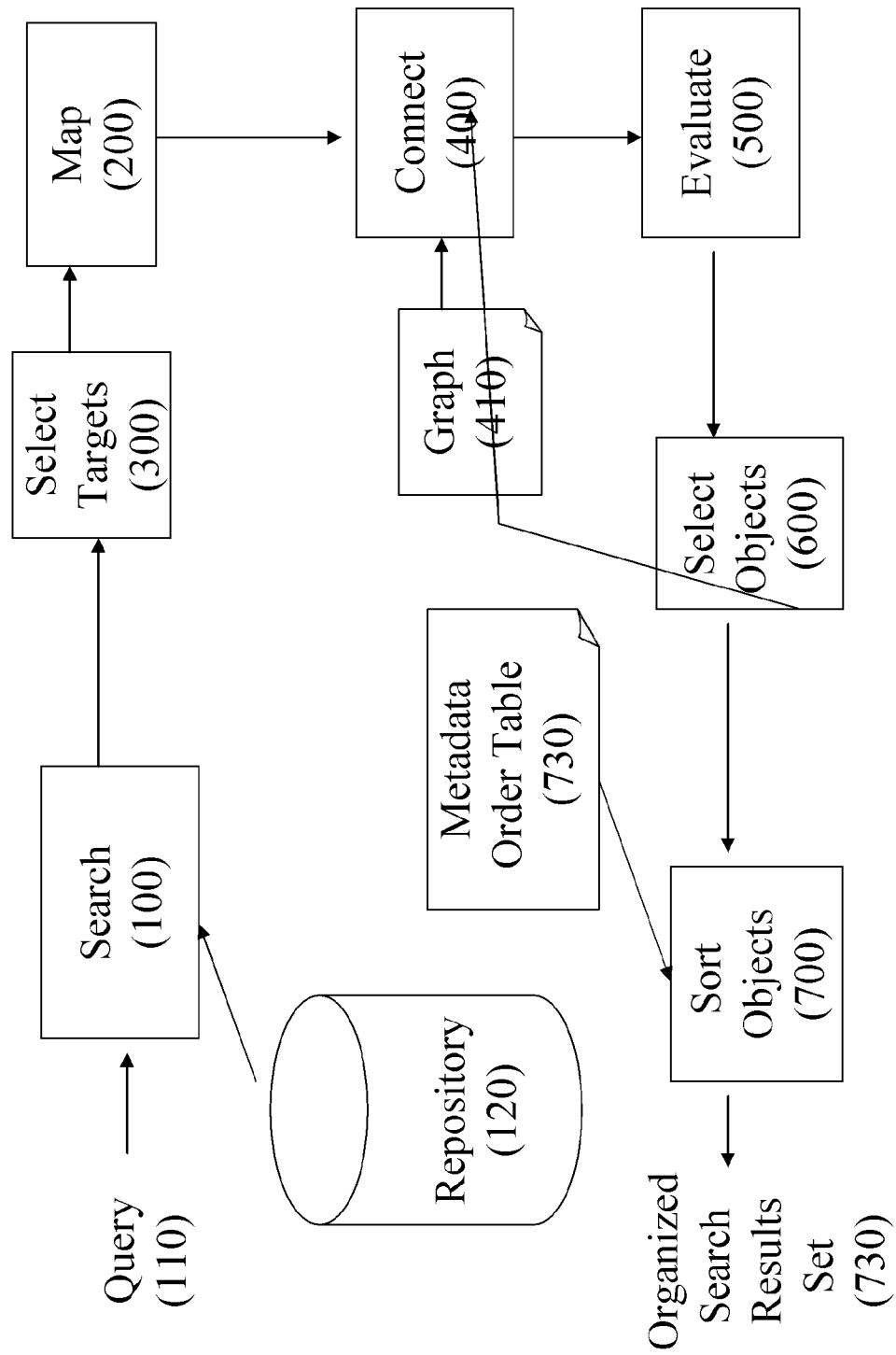
FIG. 29 shows a flowchart of a method of assembling objects into an ordered set in response to a query.

This invention also provides an assembly method (800). The assembly method provides a step for sorting (700) the output of the selection process into an Ordered Set of Objects (730). An example embodiment of the assembly process is shown in FIG. 29. An example embodiment of the assembly process without the optional step of selecting target objects (900) is shown in FIG. 8. An example embodiment of the sorting step is shown in FIG. 7. An example embodiment of the user flow through the screens of the assembly process without the optional step of selecting target objects (910) is shown in FIG. 9. In the example embodiment shown in FIG. 29, the sorting executes a total ordering of the selected objects set (610). The selected objects in the set are first sorted by their relative positions in a category order (710). In the example embodiment, the category order is total order of traversal of the category nodes in the graph. The order of the categories may reflect pedagogical principles. Each object has associated metadata that includes a role (136), also called an "intended use" in FIG. 10. The selected objects are further sorted within each said category by the relative position of said object's role (136) in a specified role order (720). In the example embodiment, the role order is a total order. The role order may reflect rhetorical, cognitive, or domain-specific principles. In the example embodiment, our rhetorical principles put "introduction" first and "conclusion" last. The cognitive principles put the roles "motivation", "concepts", and "procedures" in the specified order. The domain-specific principles put "scenarios", "definitions", "architecture", "system", and "code listing" in the specified order. These principles may be combined to determine said total order. In other embodiments, the role order may be determined relative to the particular categories in the graph. In the example embodiment, the Ordered Set of Objects (730) is stored in an XML file encoded in the IMS Content Packaging format. Each Web resource is listed in the resource element (733) 1.6.2 in the Href attribute (1.6.2.3). The order of each item element (732) 1.5.2.4 is given in that item's position within an organization element (731) 1.5.2. The aggregation is displayed as a Web page of hyperlinks to each objects and the hyperlinks are listed top to bottom. FIG. 12 shows the Web browser user interface with the ordered aggregation as a course outline Web page. Each Web resource becomes a hyper linked lesson and the lessons are displayed order specified by the sorting process. In other embodiments, the ordered aggregation may be a course comprised of learning objects that are launched by a learning management system, where said learning management system decides on the next learning object based upon the order of the learning objects in the course.

Figure 11:
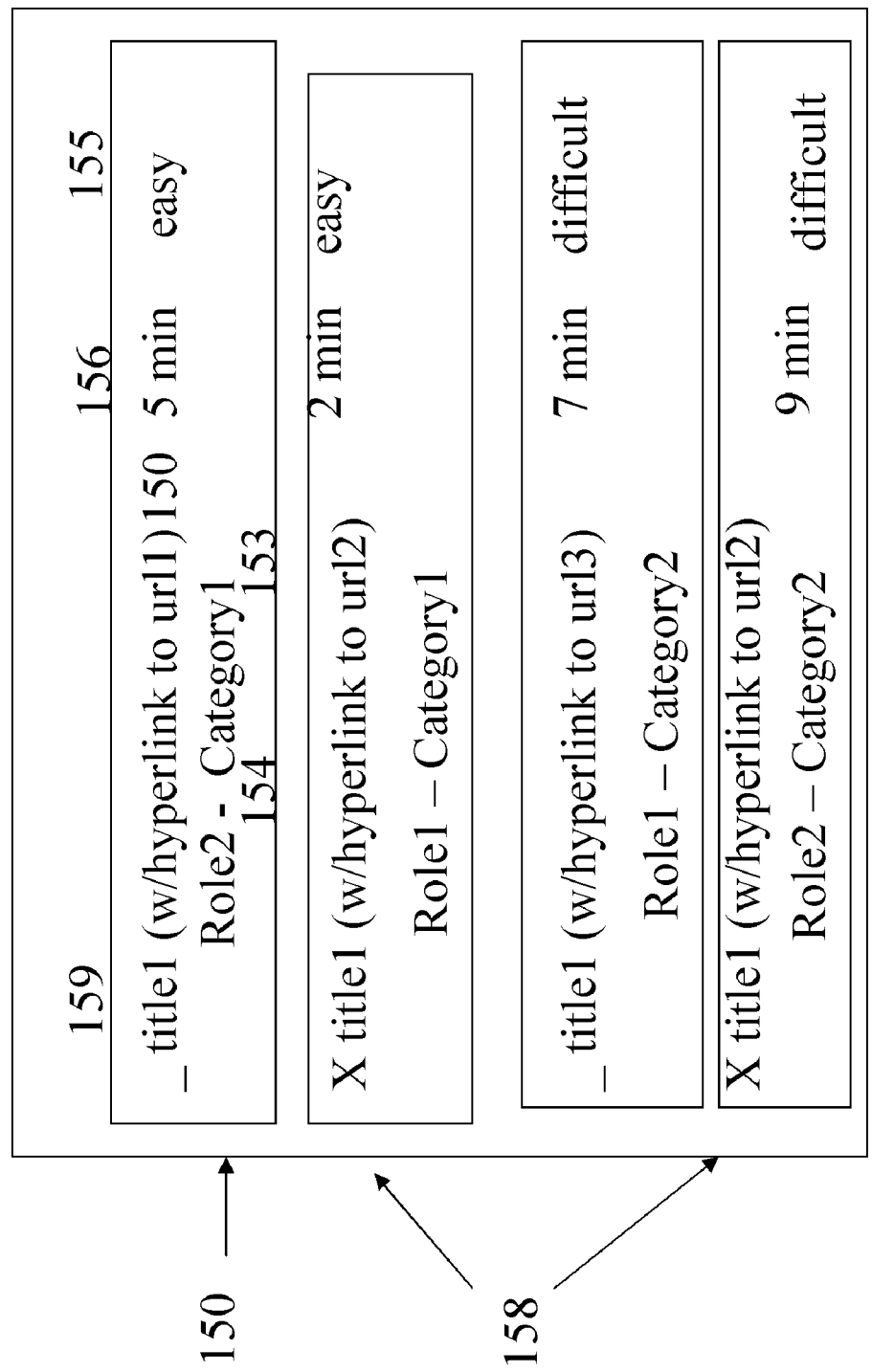
FIG. 11 shows a screen of a system for selecting objects with a metadata file.
Figure 18:
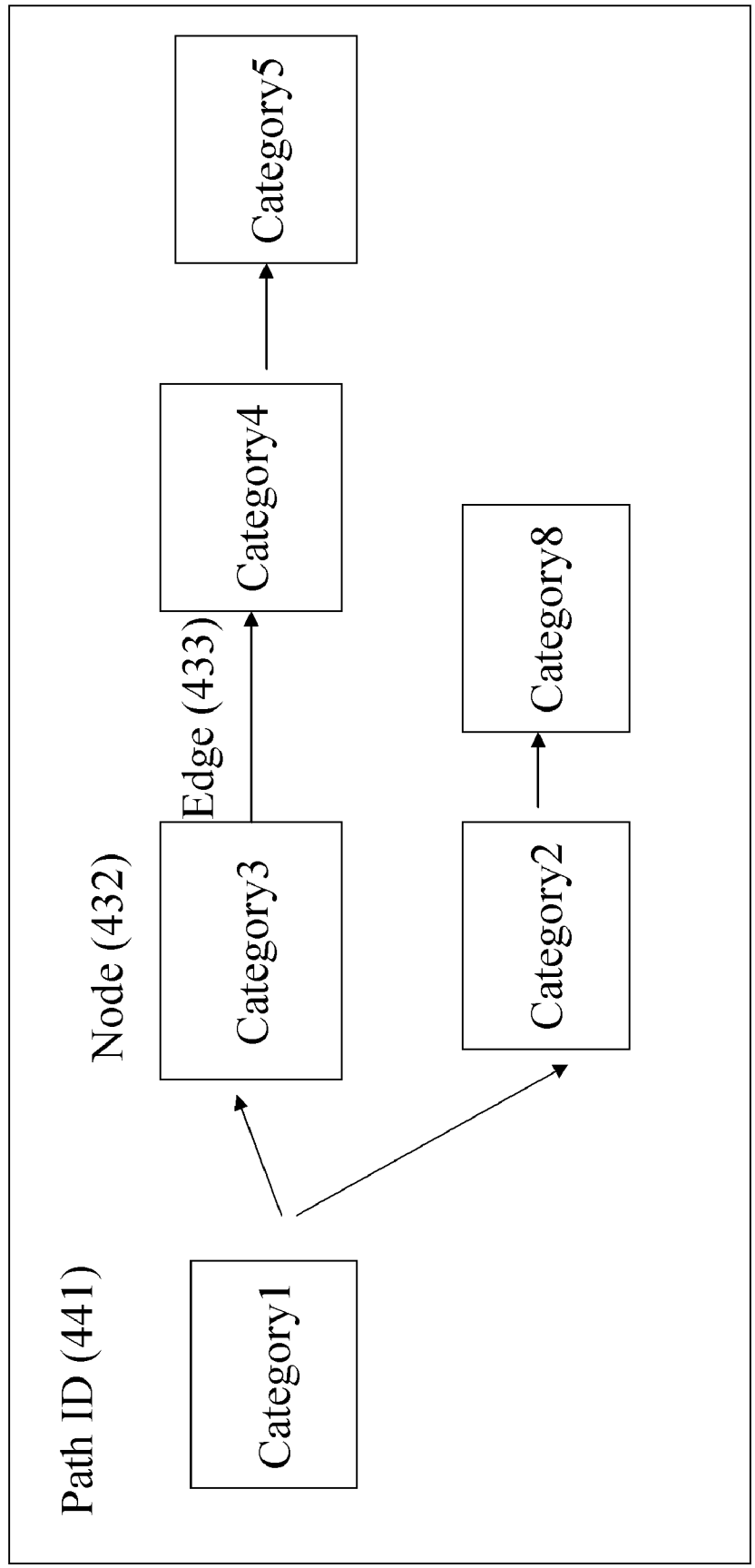
FIG. 18 shows a data structure for storing paths.
Figure 20:
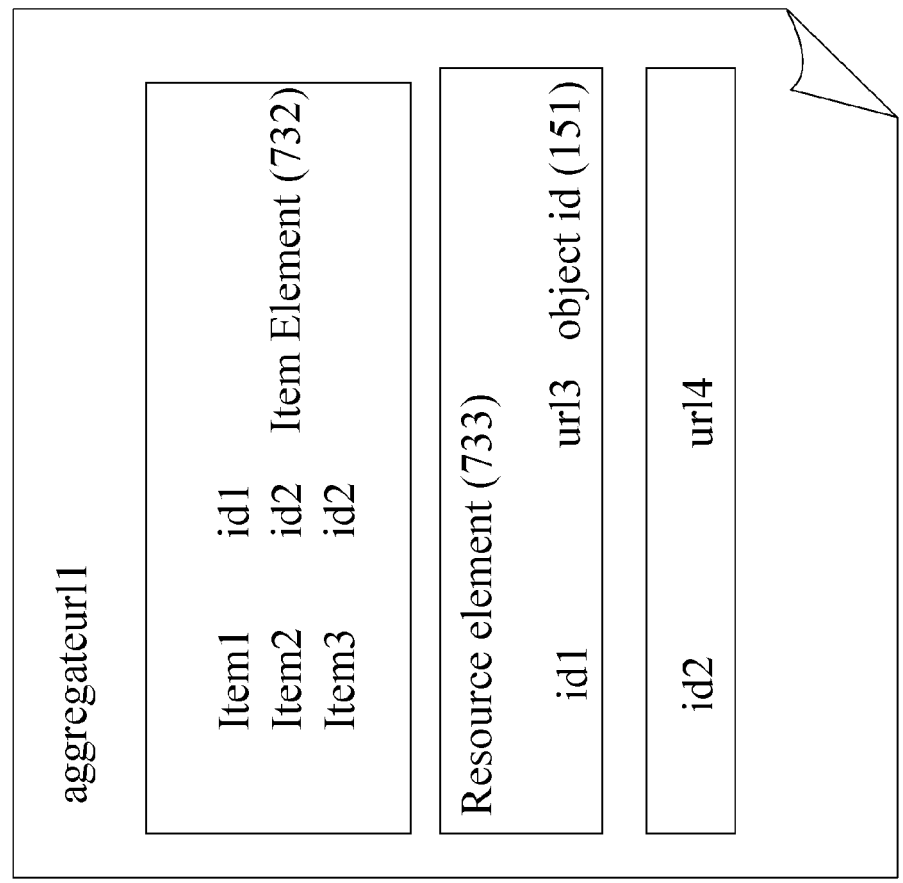
FIG. 20 shows a data structure for storing an ordered aggregation of objects.
Figure 21:
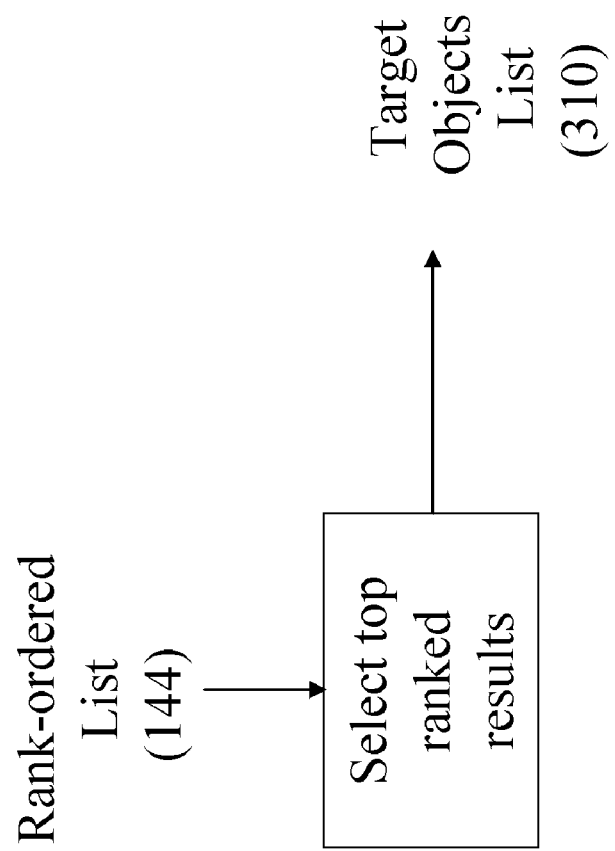
FIG. 21 shows a flowchart of a step of selecting target objects.
Figure 23:
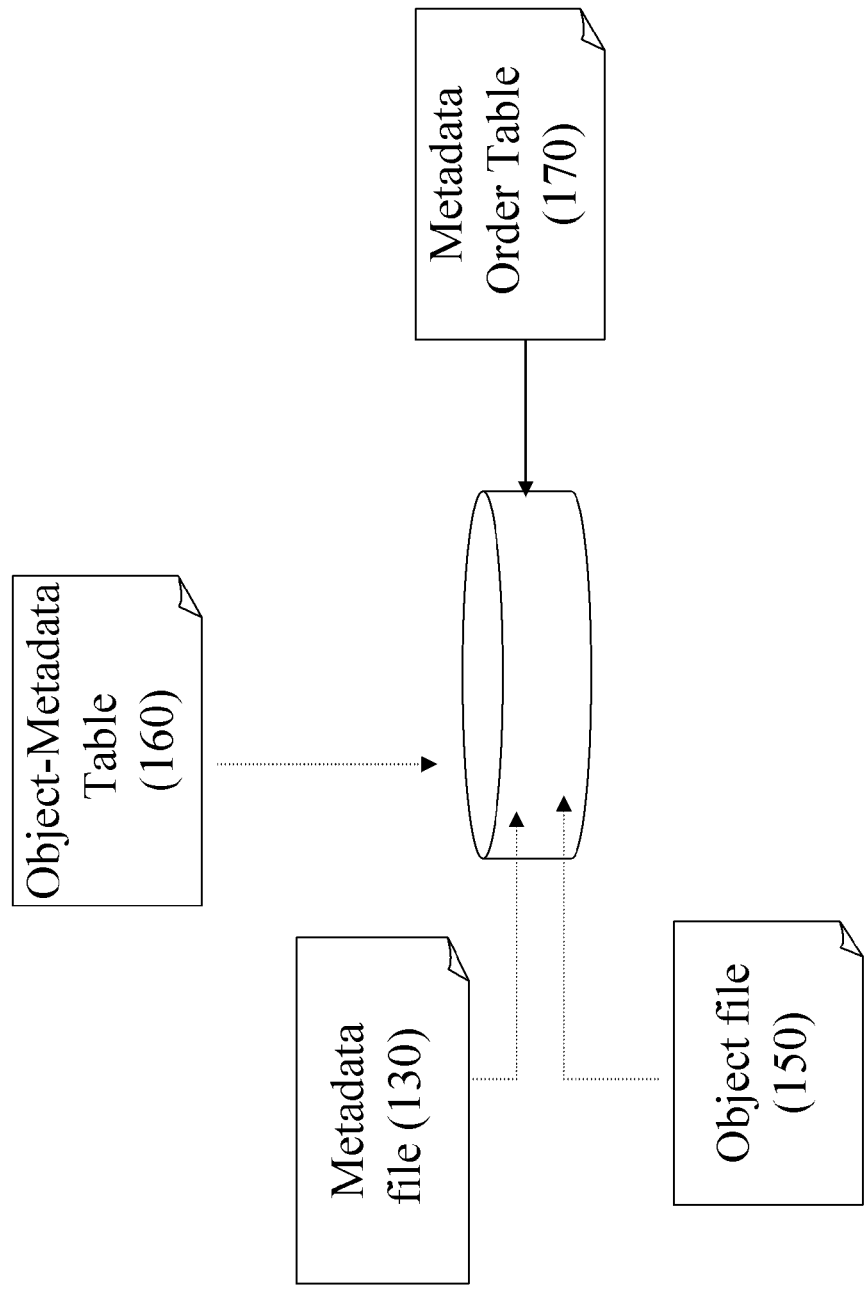
FIG. 23 shows a diagram of a repository storing a collection of objects and metadata files.
Figure 27:
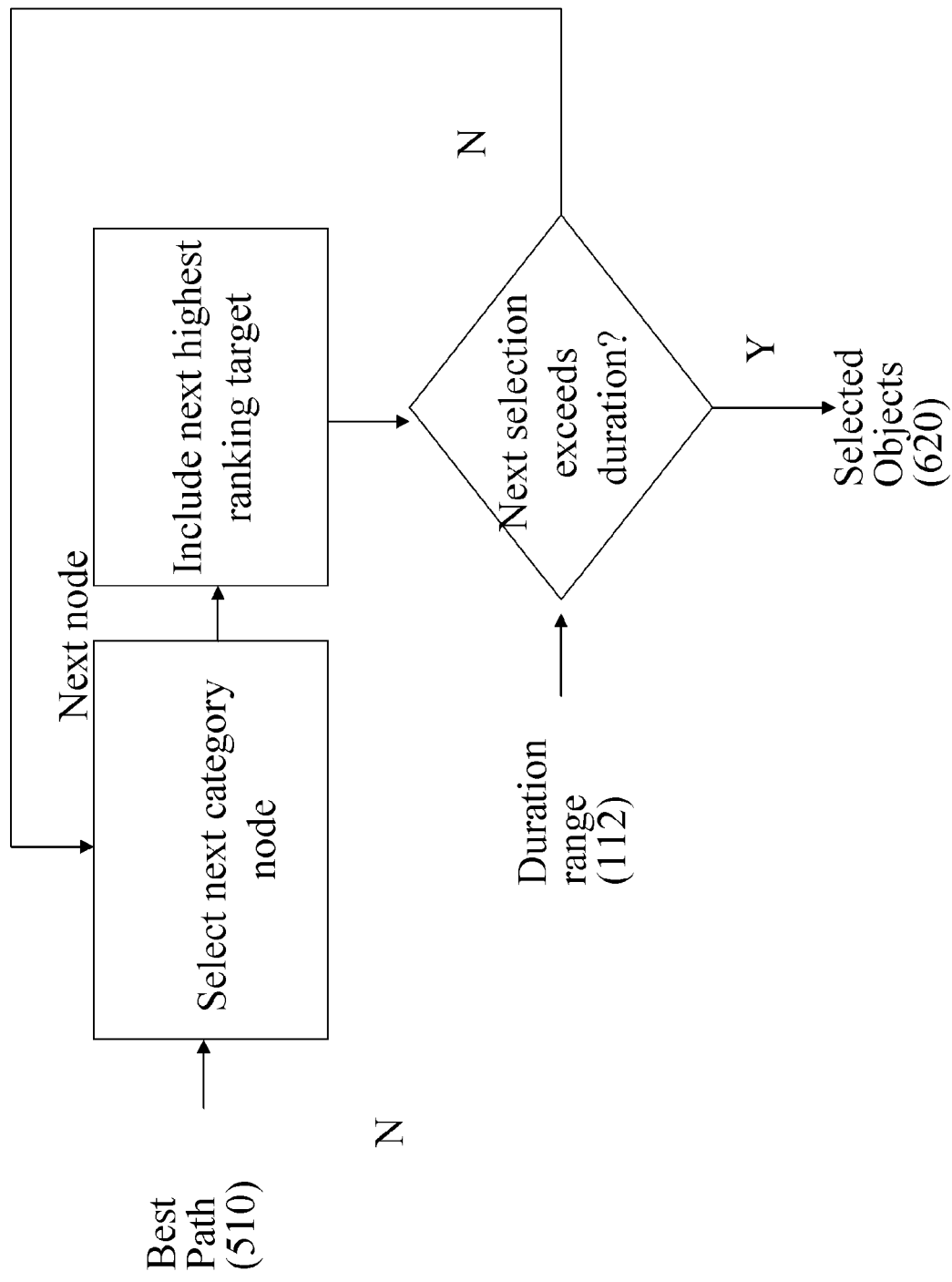
FIG. 27 shows a flowchart of a method of selecting objects for an overview treatment of a best path.
Figure 28:
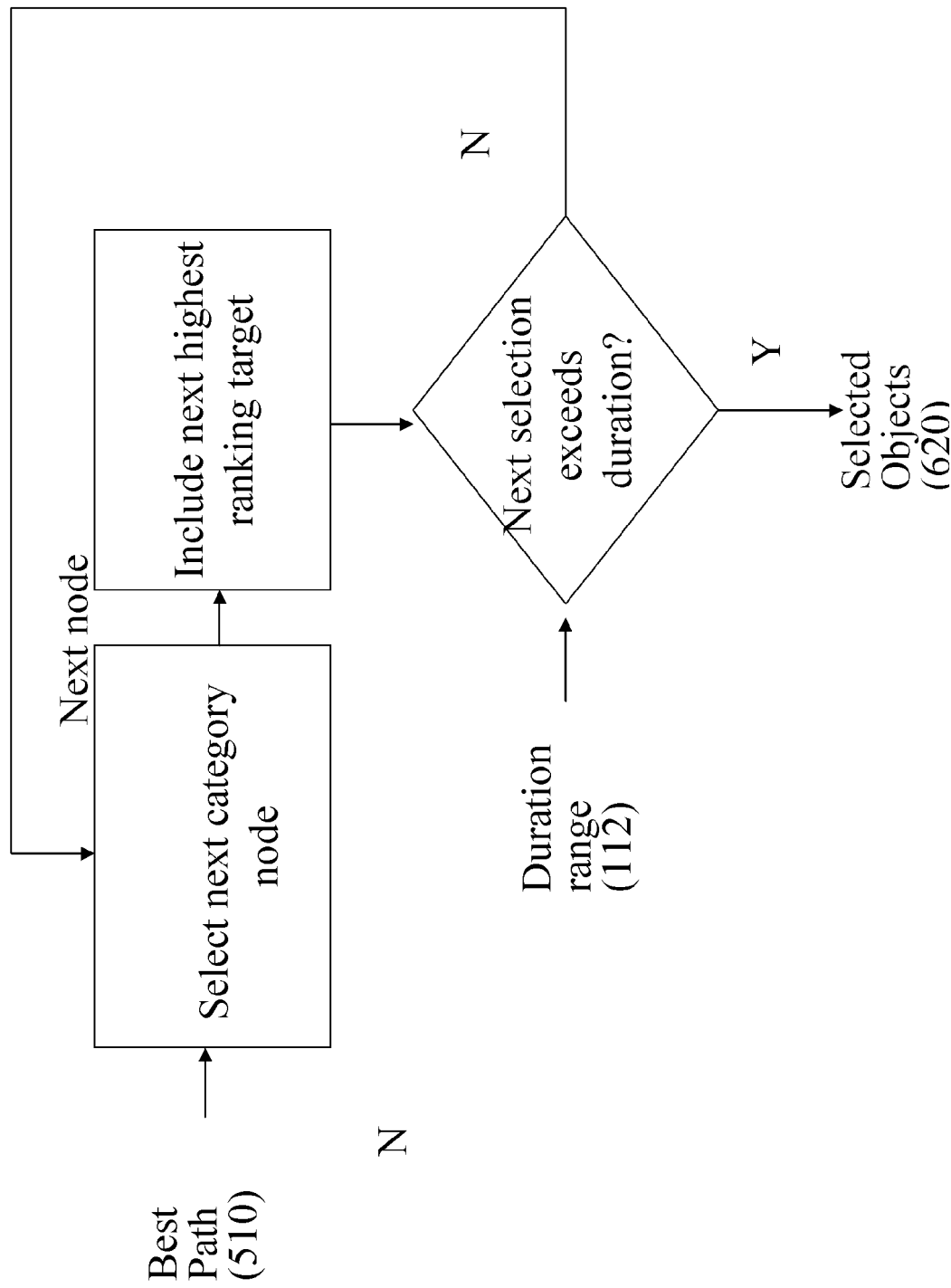
FIG. 28 shows a flowchart of a method of selecting objects for an indepth treatment of a best path.

An example embodiment is shown in FIG. 21. In the example embodiment, the target selection process selects targets from the rank-ordered list (1441) in the Search Result Table (140) as target objects for the connection process (400). This process is executed only if the user selects the "manual assembly" option (118) when specifying a query (FIG. 10). The output of the search process (100) is then a target objects list (310) of learning objects (159) that is displayed to the user (FIG. 11). In the example embodiment, selected values from each object's metadata description file (130) are displayed (FIG. 11), such as its categories (131), duration (132), media (133), resource types (134), difficulty level (135), and roles (136). The user then selects one or more target object selections (158) from the list of relevant objects. (159). The unique object identifiers of the target objects (159) are stored in the Target Objects List (310).

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The object (150) may be a document, media, Web resource, or other digital entity. For web resources, the unique object identifier (151) is specified the URI (uniform resource identifier) format. The object data (152) may be stored as digital information in a variety of formats (HTML, MPEG, JPEG, etc.) that can be stored, retrieved, and displayed from a file or files stored on a computer. If the object is a Web resource, the object data can be stored on a local or a remote server. The object data can be retrieved by its URI. In the example embodiment, the object data is stored in a repository (120) of files on a local server computer.

In the example embodiment, the rank-ordered list or related objects (144) is the result of a user query (110) using a prior art search algorithm. The rank-ordered list is a total order of unique identifiers (151) to objects that is ordered by rank and stored in the Search Results Table (140). The objects are related to the query. A query is a set of parameters and parameter values. One of the keyword parameters is keywords and its values are keywords (111). The objects contain terms (513) such as words, phrases, and other strings. A score (153) is computed for each object that indicates the relevance of the object's terms (513) to the keywords (111) in the query. In one embodiment, an index maps from the terms (153) to unique identifiers (151) and the search process use the index to look up objects given a query. FIG. 10 shows a Web browser user interface displaying the user keywords (111) of typed into a query field.

Categories (131) in the Metadata description (130) also are identified as as Category Nodes (211) in the Graph (410) and are identified as strings in the Category order (710). In other embodiments, the categories may also be the values of a category query parameter. The categories may be strings that convey topics (e.g., "websphere", "j2ee"), tasks (e.g., "install", "administer", "uninstall"), or other distinctions. The categories should be relatively semantically separable, so that it is easy to tell whether a given object belongs in a category.

Roles (136) in the Metadata description (130) are also identified as strings in the Roles Order (720). The example embodiment roles are strings from the following list of strings: ("introduction", "motivation", "scenarios", "concepts", "definitions", "architecture", "system", "procedure", "code listing", "conclusion").

A metadata description-file (130) is digital information about an object that is separate from the object data (152). Metadata may be stored in a variety of formats. In the example embodiment, the metadata description-file for each object is a document stored in a file in the repository (120) in the IEEE Learning Object Metadata (LOM) 6.4 XML format. The XML data in the file is encoded in elements that have tags with optional attributes that delimit the metadata values. The metadata values are accessed by parsing the XML file. The categories (131) metadata values are one or more values taken from a vocabulary of categories and are stored in the element [Classification|TaxonPath|Taxon|Id, 9.2.2.1]. The roles (136) are one or more values taken from a vocabulary of categories and are stored in the element [Educational|Learning Resource Type 5.2]. The duration is stored in [Educational|Typical Learning Time, 5.9]. A useful media vocabulary is taken from MIME Part Two IETF RFC 246 (http://www.ietf.org/rfc/rfc2046.txt) and is stored in [Technical|Format, 4.1]. A one-to-one mapping between object identifiers (151) and metadata description-files (130) is needed. In the example embodiment, the mapping is stored in the Object-Metadata Mapping Table (160).

In an alternate embodiment, the collection of objects is stored in a database. The database holds the object data (152) and the metadata description-file (130) for each object (150). A database query language is used to access metadata values in the metadata description-file (130).

In the example embodiment, the user query includes additional preferences as user criteria. The search process weighs the additional preferences to update the relevance score (153) that is stored in the Search Results Table (140). There are additional preferences for desired media (114), resource types, (115), and difficulty levels (116). A prior art search algorithm matches the desired media and resource types (114), desired roles (115) and difficulty levels (116) against the media (133), resource types (134), roles (136), difficult levels (135), or other metadata stored in the metadata description-file. FIG. 10 shows a Web browser user interface showing a query including selections of parameters for desired media and resource types (114), desired roles (136) labeled as "intended use", desired difficulty levels (116) and other parameters.

In the example embodiment, the user query includes a set of user constraints on the linked search results. There is a duration range (112) menu with a minimum and maximum duration and a search scope setting (113) menu with possible values of "overview" and "indepth". The duration range menu offers the user duration ranges from 1 minute in length to two hours in length on an increasing scale, each duration being roughly twice as long as the previous but rounded to convenient values. Other embodiments offer a preference for the number of categories (the path length), level of detail, or other user criteria. FIG. 10 shows a Web browser user interface with the duration range (112) entered by a user in a field labeled: Desired Course Duration", and a search scope (113) in a field labeled "Desired Search Scope" displaying the "overview" setting.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what I claim as new desire to secure by Letters Patent is as follows:

1. A method for data retrieval, said method comprising creating a set of related objects from a collection of objects, each object in the set being an item returned from a search query, said items being in a plurality of categories, categories selected are determined by the connections between said categories in a category graph, said related objects being search results that match the query and are mapped to multiple categories wherein the multiple categories are connected in a graph, the step of creating, including the steps of:

搜索 searching for a list of relevant objects, each relevant object being a ranked search result wherein a rank indicates relevance to the query, and obtaining a rank-ordered list of said relevant objects;

selecting any target objects from the rank-ordered list, each target object being a member of a selected subset of the search results;

mapping the relevant objects in the rank-ordered list into categories;

connecting the categories into paths in a graph, said graph having a node for each category and edges based upon category relationships;

terminating a graph traversal of said categories based upon reaching category nodes having at least one target object if there is a target object, and if there is no target object then terminating said graph traversal within a proximity in the graph near the most relevant category, the most relevant category being the category most relevant to the query based upon the relevance of the relevant objects mapped to said category;

choosing a best path in the graph based upon a path evaluation criterion, said path evaluation criterion based on the relevance of objects mapped to the categories; and selecting particular objects in categories on the best path based upon an object selection criterion, each particular object being an object included in search results that meet the object selection criterion;

wherein metadata is associated with at least one object being in a format of time varying media.

2. A method as recited in claim 1, wherein the set of objects are linked, said method is a computer implemented, and said query including at least one of a maximum, a minimum, and a desired duration.

3. A method as recited in claim 2, wherein the objects are Web resources and the set of objects are linked using hyperlinks.

4. A method as recited in claim 1, wherein the objects are documents.

5. A method as recited in claim 1, wherein the step of creating is to satisfy a user query including criteria about the set of objects wherein said objects each have a duration and having a maximum duration for the set.

6. A method as recited in claim 1, further comprising each object obtaining a relevance score.

7. A method as recited in claim 1, wherein the collection is stored in a repository.

8. A method as recited in claim 1, wherein the graph is a connected directed graph.

9. A method as recited in claim 1, wherein the metadata is included in a metadata description, wherein said metadata description includes at least one of: a category, a role; and a duration.

10. A method as recited in claim 9, wherein the step of mapping includes a step of accessing at least one category included in said metadata description.

11. An article of manufacture comprising a computer usable medium having computer readable program code means embodied therein for causing data retrieval, the computer readable program code means in said article of manufacture comprising computer readable program code means for causing a computer to effect the steps of claim 1.

12. A method as recited in claim 1, wherein said metadata description includes at least one of: a difficulty level, level of detail, resource type, media format, and a media type.

13. A program storage device readable by machine, tangibly embodying a program of instructions executable by the machine to perform method steps for data retrieval, said method steps comprising the steps of claim 1.

14. A method as recited in claim 1, wherein the step of searching for related objects comprises employing a user criterion taken from a group of criteria consisting of: difficulty level greater than, less than, or equal to one or more particular values, level of detail greater than, less than, or equal to one or more particular values, resource type equal to one or more particular values, media format of time varying media equal to one or more particular values, media type equal to one or more values, and any combination of these criteria.

15. A method as recited in claim 1, further comprising choosing target objects from the rank-ordered list.

16. A method as recited in claim 1, wherein the path evaluation criterion is a criterion taken from a group of criteria consisting of: path length higher than, lower than, or closest to a desired value, minimum or maximum path length, greatest number of target objects, highest sum or average of object relevance scores, highest sum of category scores averaging object relevance scores within categories, smallest number of breaks, smallest number of categories having a number of objects below a minimum number of objects, and any combination of these criteria.

17. A method as recited in claim 1, wherein the object selection criterion is a criterion taken from a group of criteria consisting of: membership in the set of target objects, highest relevance score, membership in one or more categories on said best path, a total number of objects on said best path less than a maximum number of objects or greater than a minimum number of objects, a sum of the duration of the objects of time varying media being less than a maximum duration or greater than a minimum duration or closest to a desired value, and any combination of these criteria.

18. A method as recited in claim 1, wherein the objects are Web resources and the set of objects are linked using hyperlinks.

19. An apparatus for data retrieval, said apparatus comprising means for creating a set of objects from a collection of objects, each object in the set being an item returned from a search query, said items being in a plurality of categories, and categories selected are determined by the connections between said categories in a category graph, said means for creating including:

means for searching for a list of related objects and obtaining a rank-ordered list of said related objects, said related objects being search results that match the query and are mapped to the same category or mapped to multiple categories wherein the multiple categories are connected in a category graph;

means for selecting any target objects from the rank-ordered list, each target object being a member of a selected subset of the search results;

means for mapping the related objects in the rank-ordered list into categories;

means for connecting the categories into paths in a graph, said graph having a node for each category and edges based upon category relationships, and if there are target objects then terminating a graph traversal of said categories based upon reaching said target objects, and if there is no target objects then terminating said graph traversal within a proximity in the graph near the most relevant category, the most relevant category being the category most relevant to the query based upon the relevance of the relevant objects mapped to said category;

means for choosing a best path in the graph based upon a path evaluation criterion; and means for selecting particular objects in categories on the best path based upon an object selection criterion, each particular object being an object included in the search results that meets the object selection criterion:

wherein metadata is associated with at least one object being in a format of time varying media.

20. An apparatus as recited in claim 19, further comprising a repository to store the collection of objects.

21. A computer program product comprising a computer usable medium having computer readable program code means embodied therein for causing data retrieval, the computer readable program code means in said computer program product comprising computer readable program code means for causing a computer to effect the functions of claim 19.

22. An apparatus as recited in claim 19, further comprising means for displaying the particular objects.

23. A method comprising assembling a course from a collection of learning objects, each learning object being an executable program that presents digital data to a user, said step of assembling comprising:
- searching for a list of relevant learning objects and obtaining a rank-ordered list of said relevant learning objects, each relevant learning object being a ranked search result wherein a rank indicates relevance to the query;
- selecting any target learning objects from the rank-ordered list, each target learning object being a member of a selected subset of the search results;
- mapping the relevant learning objects in the rank-ordered list into categories; connecting the categories into paths in a graph, said graph having a node for each category and edges based upon category relationships, and if there are target learning objects then terminating a graph traversal of said categories based upon reaching said target learning objects, and if there is no target learning objects then terminating said graph traversal within a proximity in the graph near the most relevant category;
- choosing a best path in the graph based upon a path evaluation criterion;
- selecting particular learning objects in categories on the best path based upon an learning object selection criterion, each particular learning object being an object included in search results that meet the learning object criterion;
- sorting the particular learning objects using at least one of: a category order, a role order, and any other sorting for metadata included in the metadata file; and
- linking the particular learning objects to form the course.

24. An article of manufacture comprising a computer usable medium having computer readable program code means embodied therein for causing assembly of a course, the computer readable program code means in said article of manufacture comprising computer readable program code means for causing a computer to effect the steps of claim 23.

25. A program storage device readable by machine, tangibly embodying a program of instructions executable by the machine to perform method steps for assembling a course, wherein query parameters include a plurality of desired difficult levels on a difficulty scale, and wherein the means for sorting uses a comparison taken from a group of comparisons consisting of: the relative position of categories in a category order, the relative position of roles in a role order; the relative levels of difficulty on the difficulty scale, the relative duration of time varying media on a time scale, or any combination of these comparisons, and said method steps comprising the steps of claim 23.

26. An apparatus for data retrieval, said apparatus comprising means for assembling an ordered set of objects from a collection of objects to satisfy a query, each object in the collection being an item returned from the query, said items being in a plurality of categories, and categories selected are determined by the connections between said categories in a category graph, said means for assembling comprising:
- means for searching for a list of relevant objects and obtaining a rank-ordered list of said relevant objects, each relevant object being a ranked search result wherein a rank indicates relevance to the query; means for selecting any target objects from the rank-ordered list;
- means for mapping the relevant objects in the rank-ordered list into categories;
- means for connecting the categories into paths in a graph, said graph having a node for each category and edges based upon category relationships, and if there are target objects then terminating a graph traversal of said categories based upon reaching said target objects, and if there is no target objects then terminating said graph traversal within a proximity in the graph near the most relevant category;
- means for choosing a best path in the graph based upon a path evaluation criterion; and
- means for selecting particular objects in categories on the best path based upon an object selection criterion; means for sorting the particular objects on the best path according to a comparison function, each particular object being an object included in the search results that meets the object selection criterion; and
- means for obtaining said ordered set of objects satisfying said query;
- wherein metadata is associated with at least one object being in a format of time varying media.

27. A computer program product comprising a computer readable medium having computer readable program code means embodied therein for causing data retrieval, wherein query parameters include a plurality of desired difficult levels on a difficulty scale, and wherein the means for sorting uses a comparison taken from a group of comparisons consisting of: the relative position of categories in a category order, the relative position of roles in a role order; the relative levels of difficulty on the difficulty scale, the relative duration of time varying media on a time scale, or any combination of these comparisons, and the computer readable program code means in said computer program product comprising computer readable program code means for causing a computer to effect the functions of claim 26.

28. An apparatus as recited in claim 26, further comprising a computer program product providing a means for displaying the course.

29. A method for data retrieval, said method comprising creating a set of objects from a collection of objects, each object in the collection being an item returned from a search query, the step of creating including the steps of:
- searching for a list of relevant objects and obtaining a rank-ordered list of said relevant objects, each relevant object being a ranked search result wherein a rank indicates relevance to the query, each of said objects including a metadata file;
- selecting any target objects from the rank-ordered list;
- mapping the relevant objects in the rank-ordered list into categories, each category accessed from the metadata file; connecting the categories into paths in a graph, said graph having a node for each category and edges based upon category relationships, and if there are target objects then terminating a graph traversal of said categories based upon reaching said target objects, and if there is no target objects then terminating said graph traversal within a proximity in the graph near the most relevant category;
- choosing a best path in the graph based upon a path evaluation criterion; and
- selecting particular objects in categories on the best path based upon an object selection criterion, each particular object being an object included in search results that meets the object selection criterion;

wherein metadata is associated with at least one object being in a format of time varying media.

30. A method as recited in claim 29, wherein the step of creating is to satisfy a user query.

31. An article of manufacture comprising a computer usable medium having computer readable program code means embodied therein for causing data retrieval, the computer readable program code means in said article of manufacture comprising computer readable program code means for causing a computer to effect the steps of claim 29.

32. A program storage device readable by machine, tangibly embodying a program of instructions executable by the machine to perform method steps for data retrieval, said method steps comprising the steps of claim 29.

* * * * *